US011531686B2

(12) United States Patent
Calco et al.

(10) Patent No.: US 11,531,686 B2
(45) Date of Patent: Dec. 20, 2022

(54) COMPUTING SYSTEM PROVIDING BLOCKCHAIN-FACILITATED SEMANTIC INTEROPERABILITY BETWEEN MULTIPLE DISPARATE SYSTEMS OF RECORD (SORS) AND RELATED METHODS

(71) Applicant: APEX DATA SOLUTIONS, LLC, Tampa, FL (US)

(72) Inventors: Bob Calco, Tampa, FL (US); Gregory E. Matton, Tampa, FL (US)

(73) Assignee: APEX DATA SOLUTIONS, LLC, Tampa, FL (US)

(*) Notice: Subject to any disclaimer, the term of this patent is extended or adjusted under 35 U.S.C. 154(b) by 144 days.

(21) Appl. No.: 16/778,521

(22) Filed: Jan. 31, 2020

(65) Prior Publication Data
US 2020/0250203 A1 Aug. 6, 2020

Related U.S. Application Data

(60) Provisional application No. 62/800,715, filed on Feb. 4, 2019.

(51) Int. Cl.
*G06F 16/27* (2019.01)
*G06F 16/28* (2019.01)
(Continued)

(52) U.S. Cl.
CPC .......... *G06F 16/275* (2019.01); *G06F 16/288* (2019.01)

(58) Field of Classification Search
CPC .............................. G06F 16/275; G06F 16/288
See application file for complete search history.

(56) References Cited

U.S. PATENT DOCUMENTS 5,926,816 A * 7/1999 Bauer ................... G06F 16/273
709/248
7,302,446 B1 * 11/2007 Boothby ............... G06F 16/275
707/823
(Continued)

FOREIGN PATENT DOCUMENTS

| KR | 101763827 | 8/2017 |
| WO | WO2017024071 | 2/2017 |
| WO | WO2017066002 | 4/2017 |

OTHER PUBLICATIONS

Gagnon, Michael L., and Grant Stephen. "A pragmatic solution to a major interoperability problem: Using blockchain for the nationwide patient index." Blockchain in Healthcare Today (2018). (Year: 2018).*

(Continued)

*Primary Examiner* — Mohsen Almani
(74) *Attorney, Agent, or Firm* — Allen, Dyer, Doppelt + Gilchrist, P.A.

(57) ABSTRACT

A system for propagating an identity state change set about shared identities may include a plurality of systems of record (SORs), and a management server cooperating with the plurality of SORs and configured to: detect discrete Create-Retrieve-Update-Delete (CRUD) operations on a given SOR related to at least one shared identity to generate an identity state change set corresponding to a current state of the at least one shared identity; transact the identity state change set, with associated metadata, to a distributed immutable long-term storage as a current transaction; propagate the identity state change set and associated metadata to replicate a current state of the at least one shared identity as of the current transaction to at least one domain cache instance, and; synchronize the current state of the at least one shared identity across the plurality of SORs from the at least one domain cache instance.

18 Claims, 14 Drawing Sheets

(51) Int. Cl.
*G06F 21/64* (2013.01)
*G06F 21/44* (2013.01)
*H04L 9/00* (2022.01)
*H04L 9/32* (2006.01)
*G06F 16/25* (2019.01)

(56) References Cited

U.S. PATENT DOCUMENTS

| | | | |
|---|---|---|---|
| 7,668,736 | B2 | 2/2010 | Jones et al. |
| 7,778,962 | B2* | 8/2010 | Shah .................... G06F 9/52 707/625 |
| 8,909,814 | B1* | 12/2014 | Sumner ............. G06F 16/273 709/224 |
| 9,032,542 | B2 | 5/2015 | Khosrowpour et al. |
| 9,466,024 | B2 | 10/2016 | Siegel et al. |
| 10,417,219 | B1* | 9/2019 | Yang .................. H04L 9/0643 |
| 2002/0165724 | A1* | 11/2002 | Blankesteijn ....... G06F 16/2308 705/1.1 |
| 2011/0302133 | A1* | 12/2011 | Kuruganti ............ H04L 67/06 707/608 |
| 2012/0150925 | A1 | 6/2012 | Gupta et al. |
| 2013/0179186 | A1 | 7/2013 | Birtwhistle et al. |
| 2014/0122129 | A1 | 5/2014 | Lesselroth et al. |
| 2014/0278550 | A1 | 9/2014 | Pestka |
| 2015/0120651 | A1 | 4/2015 | Rajbhandari et al. |
| 2015/0332283 | A1 | 11/2015 | Witchey |
| 2016/0019666 | A1 | 1/2016 | Amarasingham et al. |
| 2016/0308963 | A1* | 10/2016 | Kung .................. G06F 16/1865 |
| 2018/0082024 | A1* | 3/2018 | Curbera ............. H04L 9/0637 |
| 2019/0238316 | A1* | 8/2019 | Padmanabhan ....... H04L 9/3297 |
| 2019/0303031 | A1* | 10/2019 | Sabourin ................ G06F 16/00 |

OTHER PUBLICATIONS

Azaria, Asaph, et al. "Medrec: Using blockchain for medical data access and permission management." 2016 2nd international conference on open and big data (OBD). IEEE, 2016. (Year: 2016).*

Perez de Laborda Schwankhart C. Incorporating relational data into the Semantic Web (Doctoral dissertation, Düsseldorf, Univ., Diss., 2006). (Year: 2006).*

Yang J, Papazoglou MP, Krämer BJ. A publish/subscribe scheme for peer-to-peer database networks. InOTM Confederated International Conferences" on the Move to Meaningful Internet Systems" Nov. 3, 2003 (pp. 244-262). Springer, Berlin, Heidelberg. (Year: 2003).*

Milliner S, Bouguettaya A, Papazoglou M. A scalable architecture for autonomous heterogeneous database interactions. InVLDB Sep. 11, 1995 (vol. 95, pp. 515-526). (Year: 1995).*

Hammer J, McLeod D. An approach to resolving semantic heterogeneity in a federation of autonomous, heterogeneous database systems. International Journal of Intelligent and Cooperative Information Systems. Mar. 1993;2(01):51-83. (Year: 1993).*

"APEX Data Solutions" www.apexdatasolutions, net; 2016; pp. 2.

Bernard Marr "This is Why Blockchains Will Transform Healthcare" https://www.forbes.com/sites/bernardmarr/2017/11/29/this-is-why-blockchains-will-transform-healthcare/#5fd746b91ebe; Nov. 29, 2017; pp. 5.

"Datomic Rationale" http://www.datomic.com/rationale.html; retrieved from internet; Dec. 22, 2016; pp. 9.

EHealth First "How Blockchain Technology Will Transform Healthcare in 2018" Bitcoinist: https://bitcoinist.com/blockchain-technology-will-transform-healthcare-2018/Jan. 16, 2018; pp. 5.

"Health Level 7" https://en.wikipedia.org/wiki/Health_Level_7; retrieved from internet Jan. 31, 2020 pp. 5.

Katherine Kuzmeskas "Blockchain in Healthcare: 2017™s Successes" https://www.coindesk.com/blockchain-healthcare-2017s-successes Dec. 29, 2017; pp. 3.

Mike Orcutt "Who will build the health-care blockchain?" https://www.technologyreview.com/s/608821/who-will-build-the-health-care-blockchain/ pp. 3.

"The Components of Datomic" http://www.datomic.com/overview.html; retrieved from internest Dec. 22, 2016; pp. 4.

"VistA" https://en.wikipedia.org/wiki/VistA; Retreived from internest Dec. 22, 2016; pp. 12.

"What is interoperability?" https://www.himss.org/library/interoperability-standards/what-is-interoperability; retreived from internet Jan. 31, 2020; pp. 2.

"HL7 FHIR" https://www.hl7.org/fhir/; retrieved from internet Jan. 31, 20; pp. 2.

* cited by examiner

COMPUTING SYSTEM PROVIDING BLOCKCHAIN-FACILITATED SEMANTIC INTEROPERABILITY BETWEEN MULTIPLE DISPARATE SYSTEMS OF RECORD (SORS) AND RELATED METHODS

CROSS-REFERENCE TO RELATED APPLICATIONS

This application claims the benefit of U.S. provisional application no. 62/800,715 filed Feb. 4, 2019, which is hereby incorporated herein in its entirety by reference.

TECHNICAL FIELD

This disclosure relates to the fields of distributed transactional database management systems (DBMS) and enterprise Service-Oriented Architectures (SOA), and more particularly to "semantic interoperability" between disparate database systems in minimally-related business domains.

BACKGROUND

Conventional Enterprise Application Integration (EAI) techniques for data sharing within a given Information Technology (IT) topology in a business or organization commonly involve Message-Oriented Middleware (MOM) systems that provide network transparency for calls to Application Programming Interfaces (APIs) and explicit publishing of and subscription to message streams produced by well-known sources of data whose enterprise data mappings must be known in advance to all subscribers. This network transparency is beneficial in its intended context to ensure physical topology changes do not break long-running client-server operations, but it is wholly impractical beyond the scope of any one IT network, particularly when the hard requirements for "semantic interoperability" demand sharing of protected information across legal entity boundaries, for whom the IT topologies of external stake-holding systems (relative to a given SOR running on a specific IT network of a single legal entity or organization) are necessarily completely opaque.

Significantly, it is moreover the case even on a given IT network of any moderately-sized enterprise that local entity domain data is distributed across disparate internal SORs whose data models and in some cases core semantic abstractions are not strictly identical, even if they are conceptually aligned by a common business domain in some business-critical function. For example, insurance companies in diverse industries have information about the same pool of contracted service providers across many internal databases involving commercial contracts and even government-mandated programs supported by the insurer. These are typically used to maintain contract-specific provider registries, and are subject to government audit in the case of government-supported insurance programs, but this is just one example.

As another example, consider a financial services company who keeps client information in multiple systems. One database application might pertain strictly to client engagement and billing concerns, whereas another might relate clients to specific products and financial positions relative to those products. Yet another system might record details about the client at various meetings, for the purpose of determining client suitability for various investment and insurance recommendations, proof of which is mandated by law in some jurisdictions. The point is, all three systems "know about" each client, but are designed for different aspects of the financial service company's relationship with each client. To have a full view of any given client it is necessary to aggregate the data from these systems for reporting and business intelligence purposes. Some changes, such as change of client address or surname, would need to be propagated to each system, as much as they contain the same affected data elements. This is usually a manual data entry or ad-hoc batch processing job, neither of which are real-time, and all of which are error-prone. For this reason, information in one of the systems can frequently be out of sync with the others, adversely impacting the business logic of one or all of the systems.

Structural interoperability, much less "semantic interoperability" as it is commonly defined (see below), has therefore proven elusive even in enterprises in which the semantic misalignment of systems is not the primary inhibitor of meaningful data sharing. In these enterprises, the operational infrastructure to affect real-time data synchronization is typically lacking. Advantageously, the present approach has value even in the absence of external requirements to share entity information across organizational boundaries.

While certain industries have worked on numerous formal standards to address the mapping and coding aspects of the interoperability problem more narrowly (e.g., consider HL7 FHIR: https://www.hl7.org/fhir/), the approach disclosed herein provides a general method and example market-specific embodiments of a set of extensible software systems on a new architectural foundation to leverage such mappings for the synchronization of known truth and identification of discrepancies across participating systems requiring automated or semi-manual workflow to reconcile conflicting information.

In a world characterized by multiple "sources of truth" that are all guaranteed, at any point in time, to be out-of-sync both with each other and indeed current reality, it is important to address the problem of data reconciliation, as without it raw data exchange per the conventional concept of "interoperability" in which systems "talk to each other" could potentially do more harm than good by violating the integrity of some participating SORs with information that is less accurate than what it had before the data exchange. This is a challenge of interoperability, and the approach disclosed herein provides tools to address it directly.

For the purposes of this disclosure the definition of "interoperability" generally will be that provided by the Healthcare Information and Management Systems Society (or HIMSS) (see https://www.himss.org/library/interoperability-standards/what-is-interoperability), which breaks the concept into three progressive categories: foundational, structural and semantic. Semantic interoperability is built on top of structural, which in turn is built on top of foundational interoperability, and supposes two or more systems intended "to exchange information and use the information that has been exchanged." Further: "semantic interoperability takes advantage of both the structuring of the data exchange and the codification of the data including vocabulary so that the receiving information technology systems can interpret the data." This implies that the very nature of the information received triggers actionable behavior, a requirement for which traditional database information models are fundamentally inadequate, for reasons disclosed herein.

SUMMARY

A system for propagating an identity state change set about shared identities may include a plurality of systems of record (SORs), and a management server cooperating with the plurality of SORs and configured to: detect discrete Create-Retrieve-Update-Delete (CRUD) operations on a given SOR related to at least one shared identity to generate an identity state change set corresponding to a current state of the at least one shared identity; transact the identity state change set, with associated metadata, to a distributed immutable long-term storage as a current transaction; propagate the identity state change set and associated metadata to replicate a current state of the at least one shared identity as of the current transaction to at least one domain cache instance; and synchronize the current state of the at least one shared identity across the plurality of SORs from the at least one domain cache instance.

More particularly, the management server may be further configured to cooperate with the plurality of SORs to align divergent data points preventing the SORs from replicating the current state of the at least one shared identity. By way of example, the metadata may include instructions for repeatably recreating the current state of the at least one shared identity as of the time of the current transaction. The identity state change set may correspond to graph-based information about the at least one shared identity, for example.

In an example embodiment, the management server may be configured to cooperate with the given SOR to detect the discrete CRUD operations based upon an SOR adapter service process operating independently of the given SOR. More particularly, in an example implementation the SOR adapter service does not modify operational semantics or core data requirements associated with the given SOR.

Furthermore, the management server may be configured to cooperate with the plurality of SORs to transact the identity change state using a dedicated, distributed transactor service process. Moreover, the distributed transactor service process may be further configured to generate a master identity index including the at least one shared identity to be replicated across the plurality of SORs.

In an example implementation, the at least one domain cache instance may represent a single source of truth comprising a subset of known identities relevant the plurality of SORs. Furthermore, the management server may be further configured to cooperate with the plurality of SORs to synchronize the state of the at least one shared identity via a synchronization service process. By way of example, the management server may be configured to cooperate with the given SOR to store the immutable log in the long-term storage with a transaction history for the at least one shared identity verified using a blockchain algorithm.

A related management server, such as the one described briefly above, is also provided along with a related method for propagating an identity state change set about shared identities. The method may include operating a management server in cooperation with a plurality of systems of record (SORs) to: detect discrete Create-Retrieve-Update-Delete (CRUD) operations on a given SOR related to at least one shared identity to generate an identity state change set corresponding to a current state of the at least one shared identity; transact the identity state change set, with associated metadata, to a distributed immutable long-term storage as a current transaction; propagate the identity state change set and associated metadata to replicate a current state of the at least one shared identity as of the current transaction to at least one domain cache instance; and synchronize the current state of the at least one shared identity across the plurality of SORs from the at least one domain cache instance.

DETAILED DESCRIPTION

Figure 1:
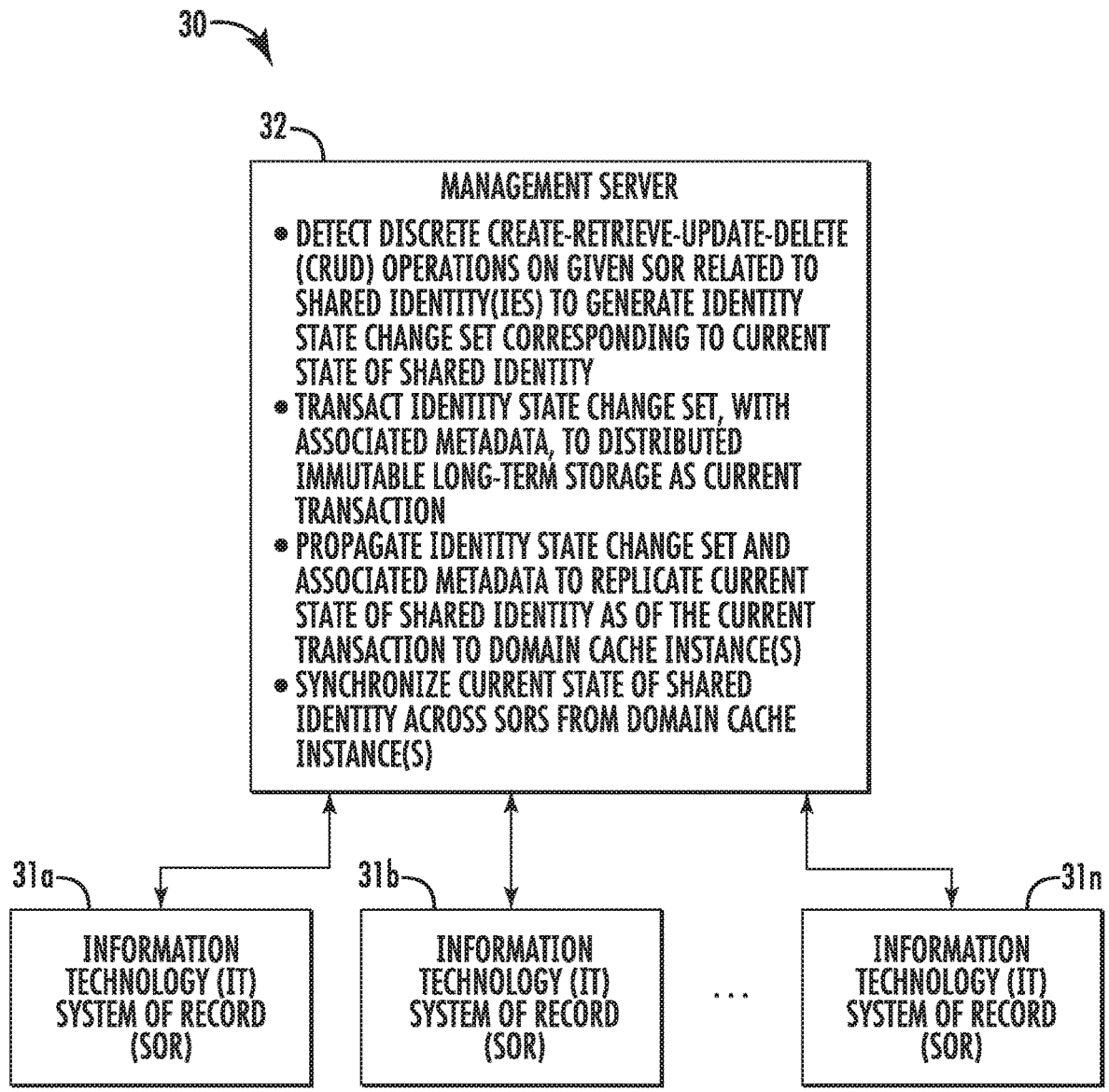
FIG. 1 is a schematic block diagram of a system for providing interoperability between different SORs in accordance with an example embodiment.

As noted above, the present disclosure relates to the fields of distributed transactional database management systems (DBMS) and enterprise Service-Oriented Architectures (SOA). More specifically, it relates to the transparent, secure, orderly exchange of semantically relevant domain entity events and related domain entity state changes across heterogeneous IT systems, networks, and organizational boundaries, in near or "soft" real-time, sufficient to realize a practical, large-scale implementation of "semantic interoperability" between disparate database systems in minimally-related business domains. The approach set forth herein provides a platform for distributed, coordinated data flow and represents an effective alternative to conventional push-pull API-based strategies for data exchange that have proven impractical for large-scale use and failed to provide "semantic interoperability" according to its current definition.

Further to the above background, there is therefore a need particularly in service-oriented domains, such as healthcare and finance, for example, for a generalized approach to the broad sharing of semantically rich domain information about common entities between disparate systems of record (SORs) within, and even across, organizational boundaries. The approach set forth herein advantageously addresses this operational need in a way that is better suited to the ambitious goals of "semantic interoperability" than prior art systems.

The present disclosure includes, but is not limited to, (1) an information model uniquely suited to "soft" real-time synchronization of large-scale, immutable, fact-based data storage, (2) a practical, architectural implementation strategy for secure, low-trust, peer-to-peer network federation of that data leveraging blockchain technology, (3) a software system for generalized domain event replication and entity state reconstruction and synchronization, (4) a robust, extensible hardware and middleware platform for "semantic interoperability" between two or more SORs across one or more heterogeneous information technology (IT) networks in any services-related business domain, and (5) a method and three-stage software-based workflow-driven process for identifying and reconciling conflicting information across stake-holding systems.

In exemplary embodiments, each IT network participating in the data federation strategy of the disclosed embodiments is a fully autonomous legal entity (whether part of a larger whole or completely independent), having internally two or more disparate computer database management systems-of-record (SORs) in need of real-time and/or on-demand synchronization of domain-relevant information.

In addition to supporting data exchange in domains such as healthcare and finance, the architectural interoperability strategy set forth herein has profound implications for, among other potential applications, legacy data modernization and migration, integration of IT assets following corporate mergers and acquisitions, and government regulation and auditing of various consumer-centric industries that are characterized by the need for legal organizations (i.e., service providers) to exchange protected domain information about common customers or clients (i.e., service recipients) in secure, timely fashion. For example, this approach is applicable to health care information exchanges which are required to adhere to stringent federal privacy and data security requirements.

Furthermore, the approach set forth herein is also applicable to practice management generally, where one or more specialized service providers working as a specialized practice for one or more service organizations in a service-oriented industry is required by law (or in the interests of their customers) to share sensitive information about common services for recipients across heterogeneous IT networks, between and about related legal entities.

Turning to FIG. 1, a system 30 and associated method aspects for the domain-agnostic, non-obtrusive detection and orderly propagation of fine-grained state change of semantically rich, graph-based information about shared identities across IT systems of record (SORs) 31$a$-31$n$ in near- or soft-real-time are first described. In the illustrated example, one or more management servers 32 (which may be implemented as part of a cloud computing cluster or distributed servers, for example) cooperate with the SORs 31$a$-31$n$ to implement a 5-prong strategy. The first prong includes detection, by an SOR adapter service process operating independently of an exemplary SOR 31$a$-31$n$ under management, of discrete Create-Retrieve-Update-Delete (CRUD) operations on an SOR related to one or more shared identities. The second prong includes transacting, by a dedicated, distributed transactor service process, an identity state change set to a distributed, immutable log in long-term storage. The identity state change data set is annotated with sufficient metadata about the discrete transacted change set to recreate in a repeatable and reliable way the current state of each related identity as of the time of each transaction.

The third prong includes propagation, by a change notification system, of the alterations or updates to each affected shared identity as of transaction state T-1 (i.e., the prior transaction state) to replicate their "current state" as of the most recent or current transaction T to one or more domain cache instances. Each domain cache instance represents a single source of truth including some useful subset of the known identities relevant to one or more SORs 31$a$-31$n$ under its purview. The fourth prong includes synchronization, by a synchronization service process, of the new state across the stake-holding SORs 31$a$-31$n$ under the purview of a given domain cache instance, including the SOR that was the origin of the change. Additionally, the fifth prong includes alignment, by the same SOR adapter process, of divergent data points preventing the SOR 31$a$-31$n$ under management from representing the "current state," which should eventually be consistent across all SORs with a stake in the state of relevant shared identities as of transaction T.

More particularly, the SOR adapter service may advantageously provide unobtrusive change detection and propagation specific to the database technology of its respective SOR 31$a$-31$n$, i.e., without modifying the operational semantics or core data requirements of the SOR under management. That is, the SOR 31$a$-31$n$ under management is neither made "aware" of concrete data models or exchange formats that may be used as part of the disclosed change propagation and data federation scheme, nor is there any alteration of how any of its concurrently running or legacy "client" systems interact with it as part of normal daily operation—in other words, even the fact it is participating in external data exchange at all is opaque by design to each managed SOR.

The SOR adapter service moreover may provide a queryable, time-correlated linked-data view of the information contained in the given SOR 31$a$-31$n$, and is independently available as such, regardless whether the SOR under management was designed with linked-data technologies in mind. Furthermore, the transactor process may optionally be distributed, in which case the SORs 31$a$-31$n$ of disparate IT networks (indeed, of different organizations altogether) may participate in the disclosed change propagation and data federation scheme as if the SORs of both organizations were on the same network. Yet, this may be done without divulging any organizational-proprietary operations, rather only universally relevant identity state is shared, a focus of semantic data interoperability.

Additionally, the transactor process may advantageously provide a master identity index that is replicated across organizational boundaries. This permits each participant in the disclosed change propagation and data federation scheme to discover and, through business logic, inferencing, or other locally developed mechanism, to link any identities from managed SORs that are determined over time to refer to the same real person, thing, location or event, such that knowledge of the linkage can be shared in near-real-time along with the relevant new information and any factual conflicts such linkage may occasion. In an example configuration, the distributed transactor annotates and tags each replicated change set with comprehensive transactional metadata including, but not limited to, provenance, change agency and other important contextual information about affected identities suitable for downstream data reconciliation and data cleansing workflows, as well as point-in-time reconstruction of state of each identity that is its ultimate purpose.

Each organization participating in the disclosed change propagation and data federation scheme maintains its own complete copy of the long-term physical storage including a transaction history for all shared identities, verified using blockchain techniques or algorithms to encode each transaction and help ensure the integrity of the order and content of transactions at each transaction point. Optionally, this may be further backed by different storage mechanisms as preferred by each participant's IT organization charged with maintaining it. That is, this approach advantageously does not require participating organizations to adhere to the same long-term storage technologies to obtain certainty regarding the correctness or completeness of the data stored in their copy.

In an example embodiment, a subset of data in each copy of physical storage may be used to reconstruct the state of one or more identities affected by transactions in the long-term store in an in-memory domain cache over time, or at a particular point in time, for the purpose of operating as a "single source of truth" for downstream SOR alignment purposes. Moreover, a given domain cache instance may be configured based on flexible time and identity parameters scoped to the needs of one or more SORs 31a-31n in a given line of business or subdomain. This advantageously allows for configuration in a variety of inter- and intra-organizational environments. In addition, a given domain cache instance may be configured with standard as well as custom axioms, rules and processing logic, to apply real-world constraints related to SOR 31a-31n data integrity, yes without losing the expressive power of information in the open-world model of linked-data.

The synchronization service may further propagate updates from a given domain cache instance to one or more SOR adapters, or may instead create a data reconciliation workflow when the new state violates a business rule, indicates a serious discrepancy between one or more SORs 31a-31n requiring human intervention, or otherwise fails to process for unknown reasons. This helps prevent potentially inaccurate data from corrupting an otherwise correct SOR 31a-31n. The workflow for dealing with data discrepancies and business logic violations may be processed in a semi-manual way, the precise rules of which may be defined by each organization participating in the disclosed propagation and data federation scheme per their local business and organizational exigencies, for example.

The system 30 also provides for an information model, including a linked-data graph of one or more subjects, usually representing one or more uniquely identifiable identities in a given domain, based on non-exclusive concepts of who, what, where and when. The model may further include one or more predicates forming the mapped data elements and attributes of each shared identity, one or more predicate values representing state of subject attributes at discrete transactional points in time, and metadata about each transaction. The metadata may include provenance, origin, and agency of the graph representing the change set, with time details (factoring in time zones, location/culture, etc.) as well as other user-defined information further capturing the context in which the change of information was detected. The information model may further include a truth flag indicating, per factual assertion, whether it is being added to the knowledge base for a given identity (i.e., asserted true), or retracted (i.e., asserted false). In an example implementation, the standard subject-predicate-object (SPO) or entity-attribute-value (EAV) graphs may be further enhanced with strong notions of state-change over time, and transacted using blockchain techniques in support of replicable long term storage with strong guarantees of integrity from casual tampering.

It should be noted that the above-described distributed computer system 30 may be implemented using one or more physical computers or virtual machines/containers with one or more physical processors allocated across one or more logical or physical network topologies. In some cases they may be implemented along with firewalls preventing most forms of inter-process communication between them, except those opened up explicitly for the purpose of participating in the change propagation and data federation scheme facilitated by the management server(s) 32. The software components of the disclosed change propagation and data federation scheme implemented within the system 30 may be horizontally and vertically scalable in response to real-time network traffic caused by updates to managed SORs 31a-31n in a given domain. These software components may be implemented as non-transitory computer-readable media having computer-executable instructions for causing the various computing devices to perform the operations discussed herein.

More particularly, at least some of the software components may be incorporated at each participating IT network. Each network component may run in separate, possibly redundant or "back-up" processes (and each utilizing the power of one or more CPU, GPU or QPU processors to facilitate real-time change propagation and data federation across one or more heterogeneous networks). The software components may include one or more of: an authentication/authorization microservice; a message dispatch microservice that is aware of the components of the live system and also is used for facilitating system-wide service discovery; one or more instances of a SOR adapter microservices, each of which may be configured to participate in a domain; a domain transactor microservice, optionally distributed, that captures the change events reported by the managed SOR adapters, annotates them with transaction metadata and persists one or more identical copies of all transaction locally; a master identity index microservice responsible for assisting in identity resolution; a long-term storage microservice that is responsible for maintaining local copies of the transacted events; one or more domain cache microservices that represent time-specific state for identities scoped to one or more local SORs in a given subdomain; a synchronization microservice that updates adapters for SORs in a given subdomain so that they may be aligned with the "single source of truth" provided by the local domain cache instance; a reconciliation workflow service and related database for tracking semi-manual, human-driven resolutions to discrepancies following a three-stage reconciliation process (preparation, encounter and close-out); and a scenario-specific documentation microservice that presents a modality-agnostic interface to human resources at the point of service in the form of one or more user-experience microservices, each one specializing in a particular modality of data input, as preferred by individual users in the reconciliation workflow.

Figure 2:
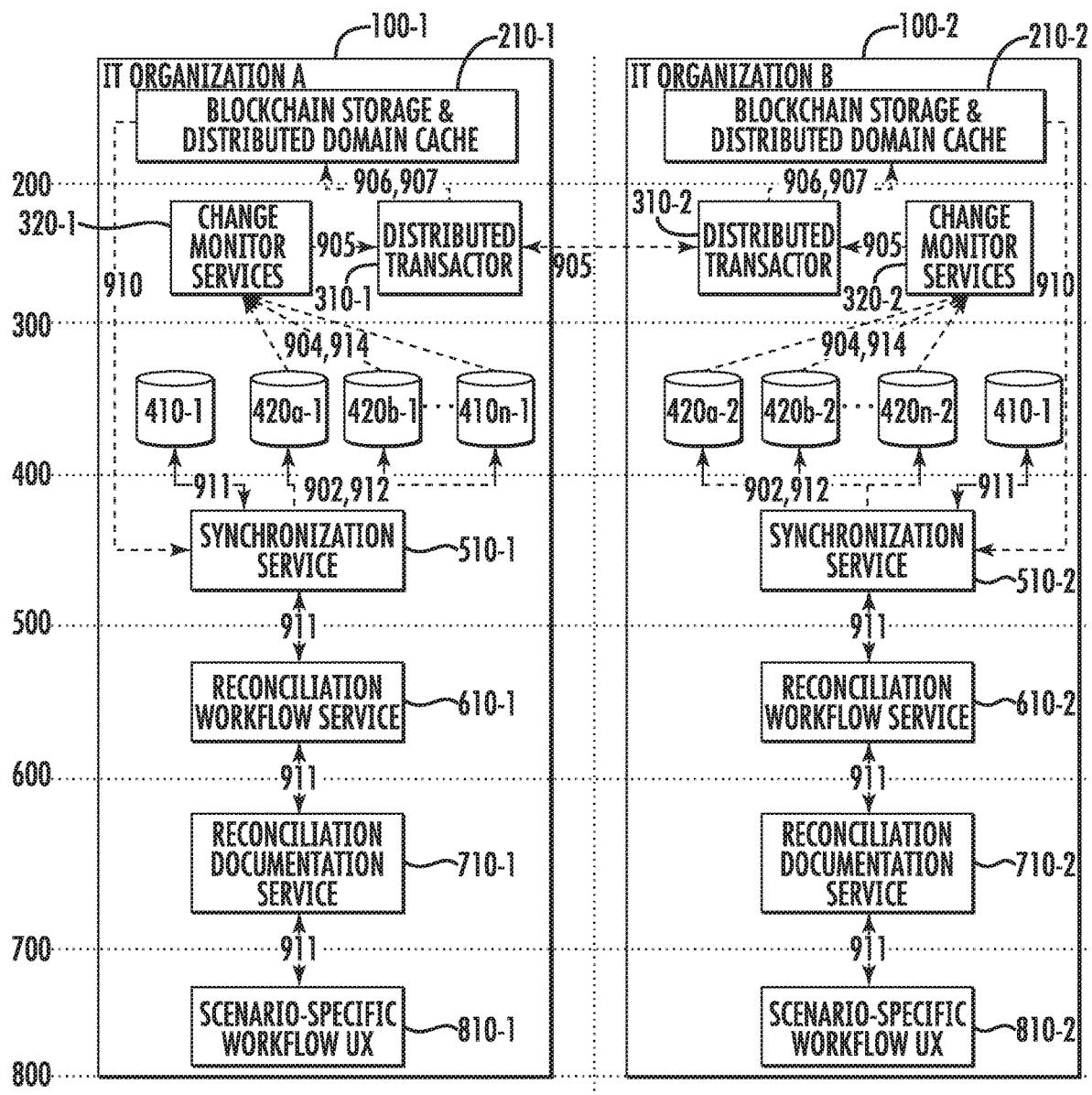
FIG. 2 is a schematic block diagram showing example SORs which may be used in conjunction with the system of FIG. 1.

The foregoing will be further understood with reference FIG. 2, which depicts an example embodiment at a high level, in the context of two participating IT networks. Reference 100-1 represents IT Organization A, and 100-2 represents IT Organization B. Both are assumed to be in the exemplary practice management domain, seeking first to keep their internal SORs in the 420 series in sync, and secondly to exchange information about common entities (i.e., customers, providers or clients), regardless which of them detects changes to the state of the entities first. It is assumed that the motivations for this data exchange are some combination of corporate self-interest, external regulatory requirements (as in healthcare for example), and/or the benefit of shared customers (as in the diverse practices involved in financial planning or healthcare broadly defined) and/or the alignment of SORs resulting from a corporate merger or acquisition. The precise nature of the motivation (or the practice) is not important, but motivation is sufficient by its mere presence to create the need uniquely met by the disclosed embodiments.

Items 400, 500, 600, 700 and 800 represent the traditional enterprise architecture "stack" as defined in most medium to large enterprises. Items 200 and 300 represent new layers provided in accordance with the present example. Items 900-914 are used in all applicable figures to denote data flows over various standard network protocols in multiple domain-specific data formats, in accordance with example embodiments of the present invention.

Different software components may operate at different layers of the architectural stack as separate, independent, in-memory computer processes communicating with each other over various standard network protocols and in domain-specific message formats. This is by design to minimize coupling, permit even stand-alone use, to promote high availability and upstream system maintenance with minimal downstream disruption, and otherwise to keep each component focused on a single architectural function or task.

Advantageously, the entire stack may therefore run on one machine, or scale across millions of machines. Accordingly, example commercial implementations may range from the consumer desktop database market to large distributed enterprises. These embodiments share common characteristics, as will be discussed further herein. Additional commercial embodiments may also be implemented using the architectures and methods set forth herein as well.

Still referring to FIG. 2, the ordering of the layers from top to bottom is significant. The topmost layer, 200, represents "Big Data" which until now has been mostly an industry phenomenon rather than a formalized architectural layer. Here, the concept is formalized into a distinct architectural layer around a new information model that uses blockchain to store vast quantities of domain-defined information in 210, as referenced in FIG. 3.

Item 210-1 denotes IT Organization A's copy of that data, and 210-2 denotes IT Organization B's copy of that data. Both have full copies in the event either goes down or loses connectivity for a period of time. Blockchain technologies are leveraged to allow both IT Organizations to recover from any service disruptions, and to guarantee both are effectively each other's data back-ups. Although FIG. 2 depicts only two IT organizations for conceptual clarity, the more IT Organizations that participate in the data sharing scheme, the less centralized and more robust the network as a whole becomes. "N" number of IT Organizations may be represented in FIG. 2 and supported in similar fashion.

Example components at layer 200 ("Big Data") illustratively include blockchain storage and a distributed domain cache represented by 210 and 240, respectively. These are discussed further below with reference to FIG. 3 and FIGS. 4A-C.

Components of layer 300 ("Interop Services") illustratively include a distributed database transactor 310 and a set of dedicated change monitoring services 320, one for each SOR under management (FIG. 2 simplifies this into one logical Change Monitor Services component for clarity). The services at 320 monitor and report new information introduced in their respective SORs to the distributed transactor 310 for processing of long-term storage and updates to the distributed domain cache 210. These are discussed further below with reference to FIG. 3 and FIG. 5.

The layer 400 ("Enterprise Data") illustratively includes an entity synchronization database 410 involved in reconciling discrepancies in automated and semi-manual workflows. The components indicated by the 420 series in both organizations represent the pre-existing SORs to be managed. The system advantageously keeps these otherwise disparate SORs accurate, up-to-date, and in-sync with respect to common entity data through a shared source of truth (i.e., the distributed domain cache at 240). These are discussed further below with reference to FIG. 3.

The layer 500 ("Enterprise Services-Oriented Architecture (SOA)") illustratively includes a local synchronization service 510 and related web services (see 520 series in FIG. 3) that manage the introduction of external novelty to managed SORs. These are discussed further below with reference to FIG. 3 and FIG. 7.

Figure 8:
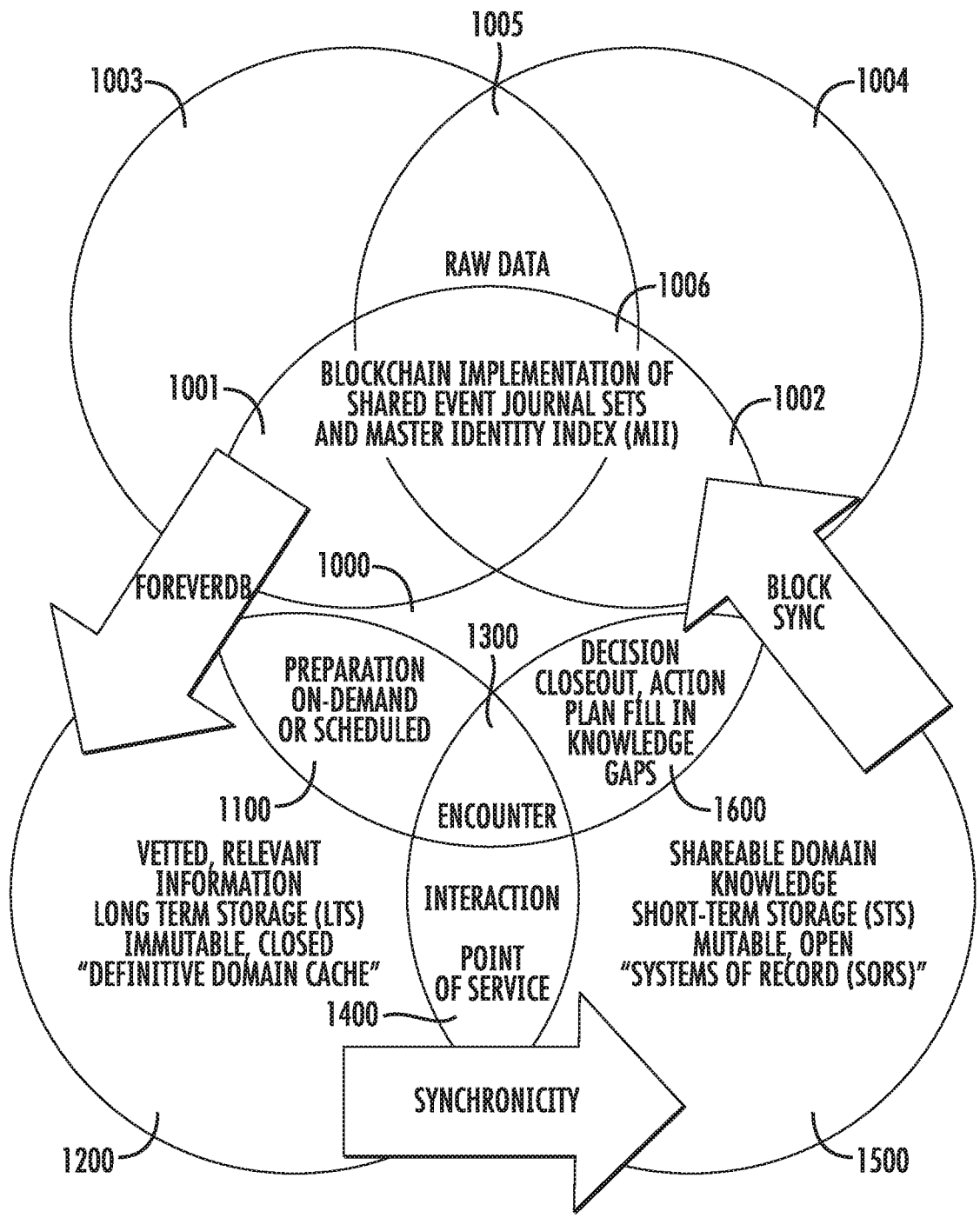
FIG. 8 is a Venn diagram illustrating a conceptual framework for the three-stage workflow strategy associated with the systems and methods set forth herein in accordance with an example embodiment.

The layer 600 ("Business Logic") illustratively includes a Reconciliation Workflow Management Service 610 that implements a three-stage discrepancy reconciliation process. These are discussed further below with reference to FIG. 3 and FIG. 6. FIG. 8 elaborates on the conceptual rationale for the three-stage workflow process implemented by 610.

The layer 700 ("Application Logic") illustratively includes the Reconciliation Documentation Service 710 that manages the three-stage process for specific workflow instances that are actively being worked on by end users at layer 800. These are discussed further below with reference to FIG. 3 and FIG. 7.

The layer 800 ("User Experience", also known as the "Presentation Layer") illustratively includes a dedicated Scenario-Specific Workflow UX interface 810. Further detail about alternatives at this layer are presented with reference to FIG. 3. These components and how they provide scenario-specific user experience with support of services at 710 and 610 are further elaborated in FIG. 10. The data flows depicted in the 900 series are further elaborated as a flowchart diagram around the notion of detecting and propagating novelty globally in FIG. 11.

The structure of the information stored on the blockchain, which is further described with reference to FIG. 4B and FIG. 4C, allows for the simultaneous maintenance of a large, distributed read-only cache of domain-relevant entity information. This represents the "source of truth" for both IT organizations, and to be more precise the "source of relevant truth" to each organization. The definition of "relevant" is tied to the unique domain identities existing outside either organization, but having commercial interactions with either or both. FIG. 4B is a schematic block diagram of an example implementation of the layer 200 ("Big Data") from FIG. 3 in greater detail, in particular showing the interactions of the blockchain storage 220. FIG. 4C is a schematic block diagram of an example process whereby domain events are transacted into long-term storage and then, in real-time or on demand, reconstructed to create a time-series of managed identity states, sometimes referred to as the entity "narrative," in the Distributed Domain Cache. This advantageously allows for insight into both the current state of the managed identity and, of potentially even more importance, how it came to be in that state over time.

For example, consider a patient of two separate hospitals or physician clinics. The domain cache 210-1 of IT Organization A 100-1 in this example will include of all patients that seek healthcare services at Organization A, as maintained by Organization A's Master Identity Index (or MII). The domain cache 210-2 of IT Organization B 100-2 will include all patients that seek healthcare services at Organization B, as maintained by Organization B's MII. Some patients seek healthcare services at both organizations, and it is advantageous both to Organizations A and B, and to their overlapping patients, that neither IT Organization A 100-1 nor IT Organization B 100-2 be lacking in current, up to date information about those patients who use the services of both Organizations. More will be said about this in the detailed discussion of FIG. 8.

Advantageously, all writes to blockchain storage 225 (see FIG. 4B) and reads from the distributed domain cache 240 (see FIG. 3 and FIG. 4A) are kept strictly separate by design, so that both may be scaled independently, and to ensure the operational integrity of immutable data and fact accrual in 220 (FIG. 3) which are important to the single-writer semantics of the transactor 310. Such an approach is known in the art as CQRS ("Command-Query Responsibility Separation"), but the disclosed approach advantageously extends this concept by implementing a distributed single-writer transactor at 310.

Single-writer systems offer strong guarantees of atomicity, consistency, isolation and durability (also known by those skilled in the art as ACID properties that can be attributed to transactional database systems). Distributed single-writer systems such as in the embodiment of 320 also help guarantee redundancy, which is why they are commonly employed in blockchain solutions, where each node in the blockchain network gets a complete immutable (append-only) copy of the data shared on the blockchain. The present approach implements writes such that ALL stake-holding systems that are part of the data sharing scheme of the present embodiment receive new domain information in the order that it comes in; but reads are locally-scoped only to identities that are relevant to a given stake-holding IT Organization. This is done not just to improve performance but also as a practical strategy for dealing with the vast quantities of information on the shared blockchain that is, strictly speaking, not relevant to systems local to a given IT Organization.

Figure 3:
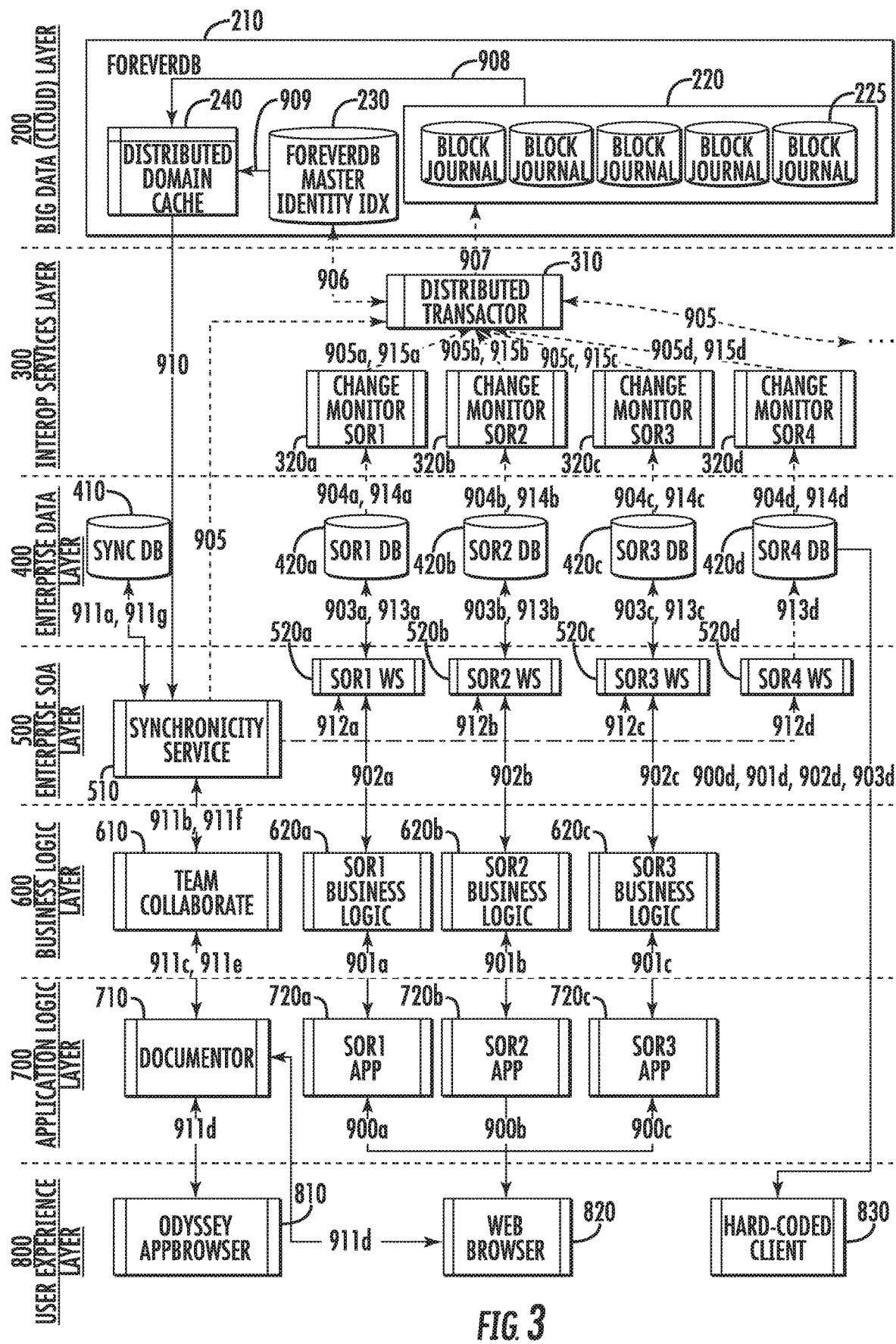
FIG. 3 is a schematic block diagram of a detailed architecture diagram of an example "full stack" approach to the system of FIG. 1 in accordance with an example embodiment.

Referring additionally to FIG. 3, this is a schematic block diagram of a detailed architecture diagram of an example "full stack" approach to the system of FIG. 1 in accordance with an example embodiment. Both storage 225 and caching 240 in 210 are also elastic by design, meaning they expand (or contract) to meet demand. Many IT organizations already leverage elasticity as a feature of infrastructure-as-a-service (IaaS), also known colloquially as "the Cloud," but the nature of their use of this typically involves use of reporting-related data mining and business intelligence applications. Data mining is not the primary focus of "Big Data" for the purposes of the present disclosure, per se, but rather raw storage and narrowing of the live domain cache to the entities that are strictly relevant downstream to systems of a specific organization. Nevertheless, business intelligence and other computationally intensive uses of "big data" which are currently popular may benefit from the granular, factual nature of the information model implemented in 210 because much of "data mining" as a discipline is attempting to reverse engineer the dimensions of lost information that the storage facilities of 210, in contrast to current relational information models, will never lose.

Let us consider at a high level the data flows as depicted in the 900 series of FIG. 2. As these will be elaborated more fully below, it is sufficient here to point out that new information is introduced to each SOR through normal business processes in the 400 Enterprise Data Layer. This is processed into long-term blockchain storage in 210 (i.e., for both organizations as the transaction is committed simultaneously at 210-1 and 210-2 via the transaction consensus phase 906 after each transactor consults with its Master Identity Index, of which actual storage at 907 is a side-effect, as depicted in more detail in FIG. 4C). If the transaction affects entities of interest to either 100-1 or 100-2, then the distributed domain cache of the affected organization(s) is updated with the new information, and the process of synchronization to non-originating SORs (i.e., the SORs across all participating IT Organizations that were not party to the origin of the novelty, but whose data is related to it) occurs in 910-912. 911 may involve manual reconciliation of certain discrepancies discovered during the synchronization process at 510 and below, as required by business logic specific to the Organization (and depicted in FIG. 10). This may in turn result in new information being obtained that is submitted to the transactor via 905 originating from 510. Finally, at 914, the alignment of the non-source SORs with the new information may be recorded locally at 210 for auditing, diagnostic and forensic/root-cause purposes.

FIG. 3 provides an elaboration of FIG. 2 with example commercial embodiments of the layered components represented in greater detail, focusing on a single IT Organization across its invention-enhanced architectural stack. In FIG. 3, for any given set of domain facts stored in 225 ("Block Journal") component 210 is composed in its current embodiment ("ForeverDB") of three subcomponents: raw elastic storage 220, containing multiple interrelated "block" journals 225 of all known domain facts and events stored on a blockchain; an identity reconciliation service a.k.a. Master Identity Index ("MII") 230 which is a hypergraph of interrelated domain-defined identities and their various local and global identifiers used to locate their relevant records in specific locally managed SORs and in identity correlation generally; and a Distributed Domain Cache 240 which represents, at any given transactional point in time, the state of all actively managed identities relevant (that is, locally scoped) to the IT Organization 100-X as represented in FIG. 3.

Still referring to FIG. 3, possible embodiments of the raw elastic storage component 220 may variously leverage existing standard commercial or open source SQL or NoSQL databases (such as graph, document or hybrid graph-document databases) or other secure data or file storage systems that are acceptable to the domain, regardless of domain schema, because the content of each "block" or record of raw data in elastic storage is isomorphic across all embodiments, and easily implemented on top of almost any physical storage, as depicted in the process described by FIG. 4C. Embodiments treat the choice of physical storage for a given domain as an orthogonal concern made explicit by configuration of a storage adapter, rather than hard-coded. Advantageously, this design decision allows the IT Organization 100-X to leverage existing investments in various storage facilities that have already been vetted for security and other enterprise requirements. Notwithstanding embodiments with embedded or default data storage options, different IT Organizations participating in the data federation scheme of the present embodiments may make diverse raw storage decisions, without affecting operational semantics.

The quantity of the data contemplated for storage in "ForeverDB" and other possible embodiments of 210 is immense, but the concept of the Distributed Domain Cache 240 is to have on hand a much smaller subset of the data in 225 that is actually used or otherwise relevant to identities actively stored in SORs at the 420 level of a given IT Organization. Accordingly, embodiments of 210 involve a distributed architecture, which is depicted in one of several possible embodiments in FIG. 4A.

It should be noted about the component 210 at the Big Data Layer 200 in FIG. 3 that, in accordance with various embodiments, its special function in data flows 908 and 909 is to transform the universe of all knowledge in the domain 220 into a manageable subset of all knowledge, scoped by 230, into the local subset of the domain 240, at every specific transactional point in time. This locally relevant snapshot of the domain represents the unified "source of truth" against which data alignment of each internal SOR 420-X at any point in time will be synchronized by downstream components in data flows 910-914.

Various embodiments of the Master Identity Index 230 and Distributed Domain Cache 240 are possible, but generally speaking they may be implemented as a hypergraph of fact-oriented graphs representing snapshots of state that detail all identities that can be correlated according to their nature in the "real world": i.e., a who, a what, a where, and/or a when. The approach set forth herein advantageously formalizes these concepts into a core ontology. It is possible that some identities at any given point in time are more than one kind of thing, something that traditional entity-relationship diagrams of traditional relational database management systems (RDBMSs) make difficult to express without resorting to complex joins that adversely and exponentially affect performance on large and rapidly growing datasets. Advantageously, the additive, distinctly factual, and time-savvy nature of the information model used in the example embodiments, and the rotating snapshot of identity state at points in time that results from its operationalization in various embodiments of 220, uniquely enable computerized reasoning about the how and why of change over time. Moreover, given a root identity key or any correlated identifier in the Master Identity Index 230, and a point in time, the system may return all knowledge (both factual and reasoned) about an identity in the Distributed Domain Cache 240 at that point in time in microseconds. More about the information model will be disclosed in the detailed discussions of FIG. 4B and FIG. 4C.

It is important at this point to note the advantageous operational implications of this interoperability strategy over current point-to-point or traditional message-oriented solutions to the interoperability problem. Namely, for any given SOR 420-X, no longer is the interoperability or data exchange problem one of "talking to" every other SOR (as in the conventional vocabulary of interoperability) or otherwise communicating actively and directly with other SORs. Instead, the present approach allows for the operationalization of data exchange by unobtrusively mapping and aligning as much as possible the data stored in each SOR 420-X individually against the single shared source of locally-scoped domain truth 240. This is achieved using web services 520 (for new information introduction, i.e., "truth alignment") and change monitoring services 320 (for new information detection). In the present approach, data exchange with all other SORs has been rendered an entirely orthogonal concern carried out in an orderly, carefully reasoned process by black box architectural components, upstack in the Interoperability Services Layer 300 and Big Data Layer 200. In other words, this makes data interoperability a proper orthogonal aspect of the enterprise's architecture, rather than an explicit concern of each and every application deployed to it.

At layer 300 ("Interop Services") we see an example embodiment of the Change Monitoring components 320*a-d*. They are tasked with detecting new information in the managed SOR of each instance. That is, 320*a* is dedicated to detecting change in 420*a*, 320*b* is dedicated to detecting change in 420*b*, etc.

Also at layer 300 of FIG. 3 is an example embodiment of the distributed transactor 310. As this level of detail demonstrates, the distributed transactor component 310 necessarily interacts with both the Master Identity Index 230 and the raw storage 220 subcomponents of 210 to transact new information into long-term storage. This has the desired side effect of updating one or more enterprise-scoped domain caches 240 after each transaction. Some embodiments may also provide a way via custom extension points to define and implement domain-defined logic for identity resolution when new entities added to the enterprise in one SOR may in fact be the same identities as already exist in other SORs, in which case the identities are linked in 230 as part of step 906. In some embodiments it may also be configured to interact in data flow 905 during a transaction with other instances of itself deployed at external IT Organizations, as depicted for example in FIG. 2. This aspect of the exemplary embodiment of 310 is in fact what makes it a distributed single-writer system.

Turning our attention now to layer 400 ("Enterprise Data"), we see the only top-level component is the Synchronization Database 410. This is not necessarily the only database in the n-tier architecture, but for the purposes of FIG. 3 it is the one most relevant to the semantics of the system as a whole, and so we discuss it here. The function of the Synchronization Database 410 in the example embodiment is to catalogue propagation of change or "new truth" to the IT Organization's SORs in the 420 series. This includes automated synchronization as well as synchronization requiring manual workflow. 410 stores the history of both automated updates and long-lived workflow sessions involving reconciliation of data in Reconciliation Workflow Service ("Team Collaborate" in the example embodiment) 610 that could not, for reasons relating to business logic or policies of the IT Organization, be automatically propagated via the Synchronization Service 510 ("Synchronicity Service" in the preferred embodiment).

Regarding layer 500 ("Enterprise SOA"), when data flow 910 indicates the need to propagate new entity state from 240 to the SORs in the 420 series, the Synchronization Service 510 is responsible in data flow 911 to ensure that only reconciled information is propagated to the SORs via microservice components in the 520 series. When the new entity state can be reconciled at 610 without violating business constraints defined in 410, then data flow 912-914 updates all SORs that were not the origin or provenance of the change detected by the corresponding 320-level component.

Advantageously, this synchronization is occurring simultaneously at all IT Organizations participating in the data sharing scheme for a given domain at 220 as of the most recent transactional context implied by FIG. 3, if and only if the transaction involves entities relevant to each IT Organization propagating new information conveyed by the most recent transaction. When new state cannot be propagated until such time as the three-stage reconciliation workflow process realized in 911*b-g* is completed, then local flows 912-913 are held in abeyance awaiting that completion. In cases where reconciliation generates new knowledge not yet propagated to 240, the new knowledge will be submitted by 510 directly to the BlockSync transactor 310 in data flow 905 (indicated without a letter subscript signifying a specific managed SOR, as 510 is considered part of the definitive SOR 240). Whether to apply the original state change partially, or to suspend it until the new information creates a new propagation data flow 910, will depend heavily on the domain-specific logic of the workflow defined at 610 and stored in 410 for the synchronization event initiated in data flow 910. In the example embodiment, all new information is transmitted to the SORs at the 420 series that does not contradict the entity state recorded at 240. Additionally, any state that represents new information compared against 240 as of the most recent transactional context is forwarded to the distributed transactor 310 for processing as new knowledge via data flow 905, creating a new "truth propagation cycle" to be initiated by data flow 910 if an only if the transaction of new knowledge at 907 succeeds, and results in an update to 240 in data flows 906-909.

Regarding the microservices in the 520a-d series of FIG. 3, the example embodiment defaults to sending messages to pre-existing web services (as depicted in 420*a-c*). However, in the absence of such a service (for example, consider 420*d*), the present approach provides a framework for rapid creation of such microservices to facilitate propagation of the new information in a form and format suitable to the target SOR (in this example, 520*d*), as advised by subject matter experts for that system.

In the case of SOR 420*d*, we find a representation of a legacy system that was not designed to fit neatly into a modern, n-tier enterprise architecture stack, but rather was built according to a client-server model. In such a model, the business, application and connectivity logic are all encompassed in a hard-coded client interface, represented in FIG. 3 as component 830 ("Hard-Coded Client"). Consequently, data flows 900*d*-903*d* are all combined into one pre-existing data flow. This is a very common problem in modern architectures: some of the systems implement the preferred architectural patterns of the organization, while certain legacy systems do not. In order to introduce novelty outside the Hard-Coded Client interface 830, such a microservice 520*d* is required to be created during an implementation of an embodiment of the invention.

Advantageously, this feature allows such legacy systems can continue to run alongside other systems, and even their eventual replacements, until such time as all data is aligned, or functionality uniquely present in 520*d* and absent from its replacement(s) is implemented as a custom workflow in 610. In other words, rather than "rip and replace" strategies that can be very disruptive to an organization, an example embodiment allows for gradual replacement of such legacy systems with minimal disruption to the usual and customary business processes of the adopting organization.

Moving on now to layer 600 ("Business Logic"), the Reconciliation Workflow Service 610 ("Team Collaborate") represents the workflow engine responsible for orderly processing of the three-stage point-of-service workflow employed for reconciliation as well as domain-specific custom business processes. Depicted here are data flows for workflow state "read" operations 911*b* and 911*c*, and data flows for workflow state "write" operations 911*e* and 911*f*. All SOR Business Logic components 620*a*-620*c* depicted may be pre-existing on the IT Organization's n-tier enterprise architecture in support of each SOR's usual and customary functionality, and advantageously need not be affected by the subsequent components added herein (i.e., the unobtrusive nature of the implementation with respect to existing systems is an advantage of the present approach).

Each reconciliation workflow session stored in the Synchronization Database 410 can involve many reads and writes during the course of long-running sessions, that in turn can involve many different web sessions and multiple users collaborating toward the conclusion of the reconciliation workflow. A simple example of this is described in FIG. 10.

In an example embodiment, data about each potentially collaborative reconciliation session is stored in an immutable form and format in 410 that is uniquely suited to replaying all UX interactions and state changes that produce the final definitive documentation (and from that, possibly, new knowledge) generated by the reconciliation sessions. This design and another application of the novel information model specific to its embodiments allows for analytics about usability, efficiency, effectiveness and other dimensions of business process quality to be assessed offline or as an orthogonal process of data mining for the purpose of continual business process improvement. The variety and scope of analytics requirements vary greatly by domain, but the present approach allows for these requirements to be defined externally and to change without requiring alterations to the user experience. Data mining can be performed multiple times, as those requirements change based on continual quality feedback. Advantageously, these changes of analytic requirements need not affect the user experience (UX) at level 800 except to improve the design of workflow sessions over time. At no time is the UX ever required to have direct knowledge of analytics requirements, much less have specific analytic capture logic hard-coded into its implementation. As is consistently the case throughout the entire stack of the example embodiments, such concerns outside the immediate domain are rendered strictly orthogonal.

At layer 700 ("Application Logic") we depict the Reconciliation Documentation Service 710 ("DocuMentor" in an example embodiment) as the top-level component orchestrating the three-stage workflow for each user involved in the reconciliation process of a specific workflow instance. More about the three-stage process for resolving and documenting reconciliation sessions is disclosed in the detailed description of FIG. 10. SOR Application Logic Components 720*a*-720*c* depicted in FIG. 3 are pre-existing components of the IT Organization in support of each SOR's usual and customary functionality, as implemented on the n-tier enterprise architecture of the organization.

At layer 800 ("User Experience")(or simply "UX"), there are two embodiments of the actual user interface, one that is web based and therefore executes inside a conventional web browser client 820, and another in an example embodiment 810 ("Odyssey"). Odyssey app browser 810 offers additional capabilities and services in support of analytics capture, accessibility, and other orthogonal concerns typically dealt with by enterprise web applications. However, there is no functional difference for end-users between browser 810 and 820 alternate UX implementations: browser 810 is simply more performant and better at keeping many aspects of implementation like accessibility and security modular.

Finally, SOR 420*d* represents, as mentioned previously, a legacy client-server system for whom the functions of the layers between 400 and 800 are embodied in the hard-coded client interface 830.

Figure 4A:
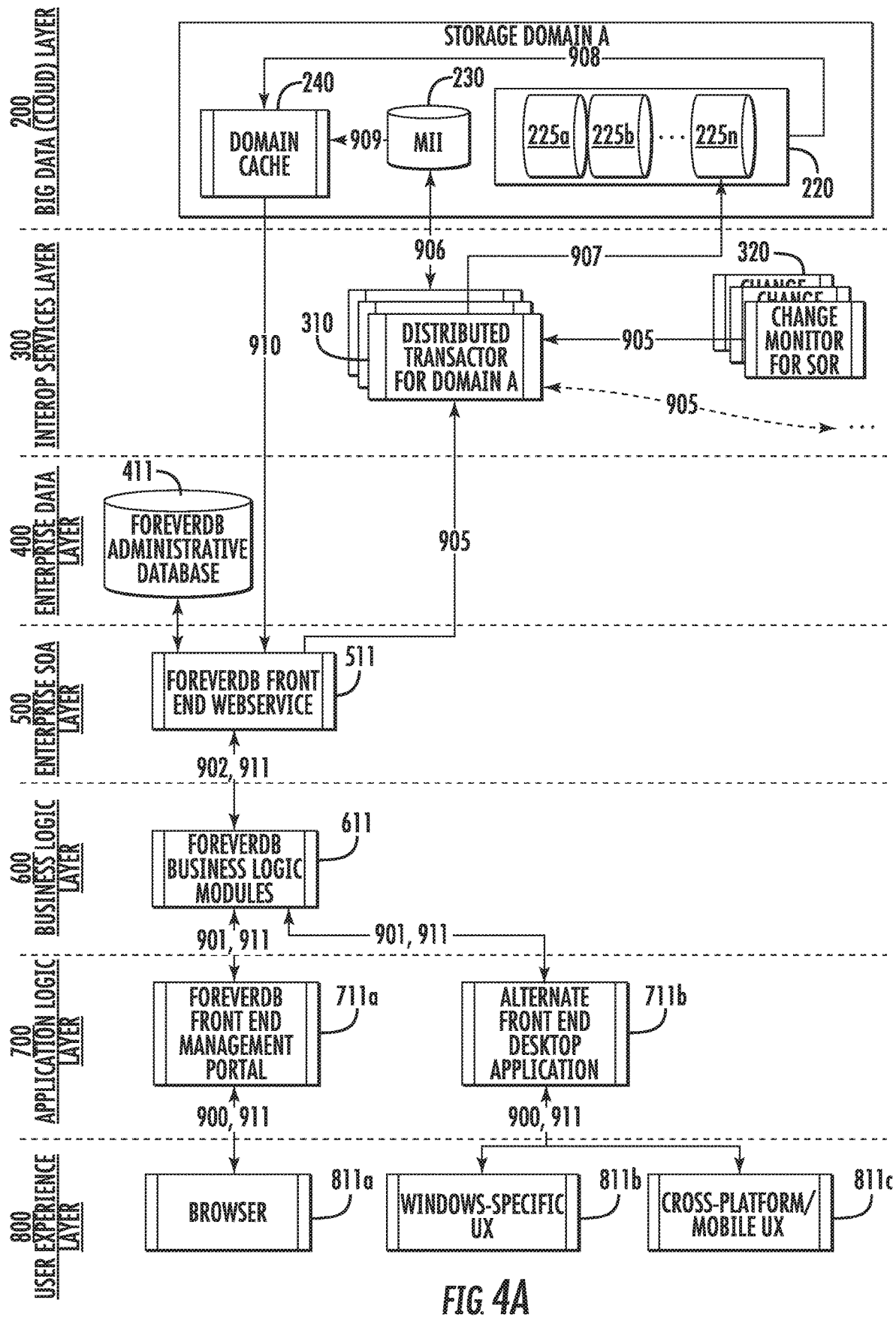
FIG. 4A is a schematic block diagram of an example implementation of the Big Data layer from FIG. 3.
Figure 4B:
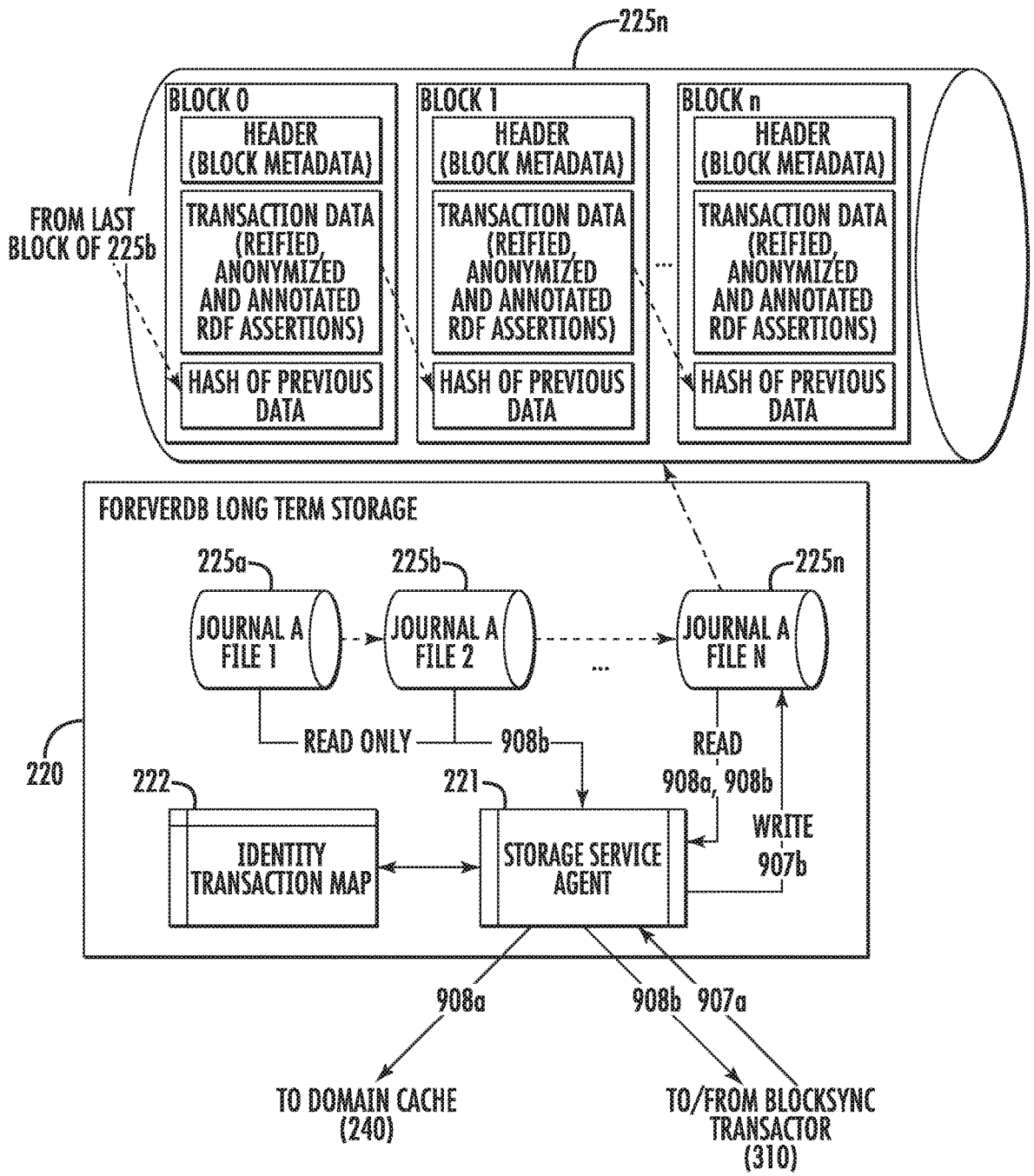
FIG. 4B is a schematic block diagram of an example implementation of the Big Data layer from FIG. 3 in greater detail, in particular showing the interactions of the blockchain storage.
Figure 4C:
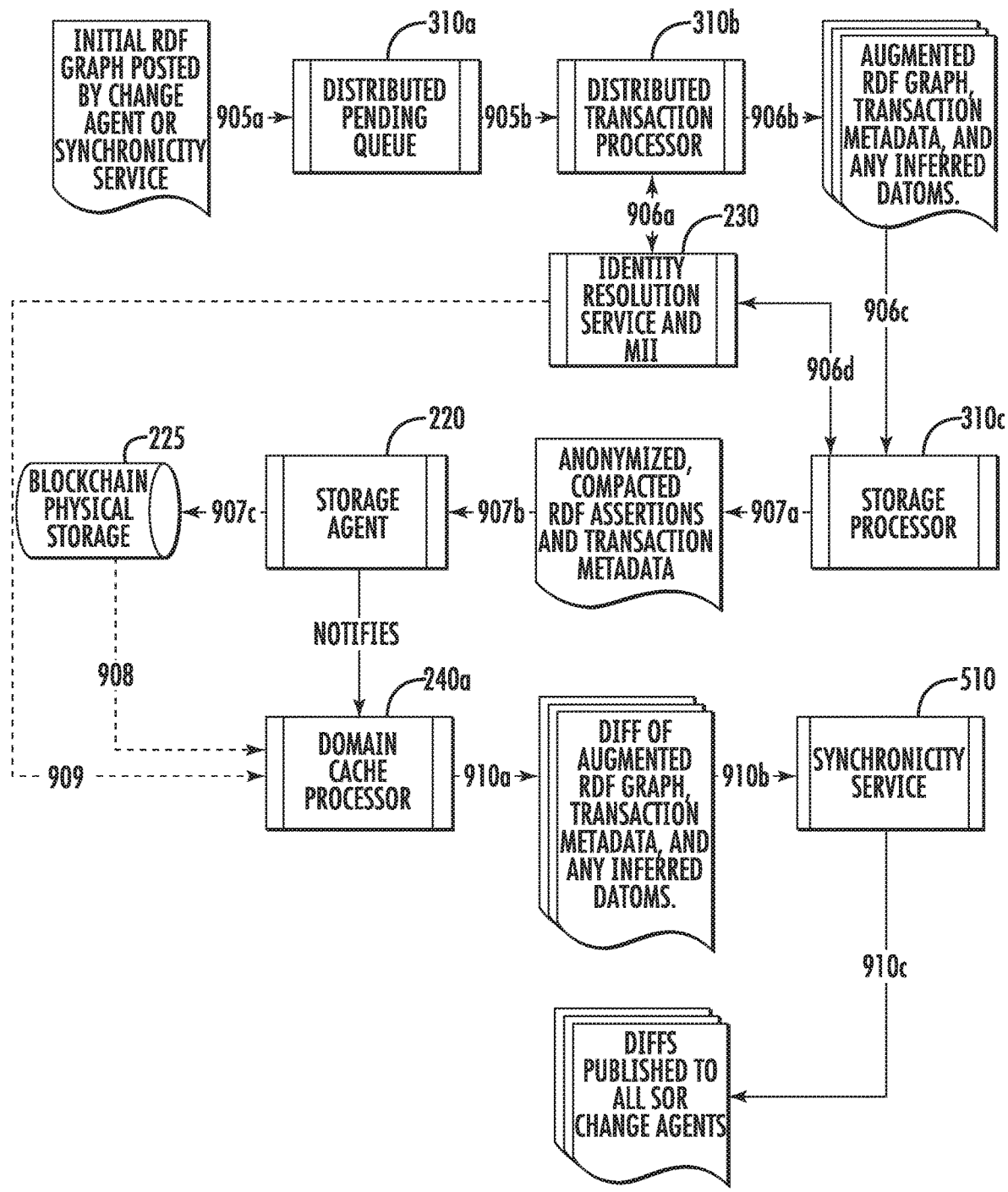
FIG. 4C is a schematic block diagram of an example process whereby domain events are transacted into long-term storage and then, in real-time or on demand, reconstructed to create a time-series of managed identity states in the Distributed Domain Cache in accordance with an example embodiment.

Turning now to FIG. 4A, this is a schematic block diagram of an example implementation of layer 200 ("Big Data") from FIG. 3, which in at least one exemplary embodiment is known as ForeverDB. "ForeverDB" has some components physically operating in layer 300 ("Interop Services"), specifically the distributed transactor 310, owing to its internally distributed architecture. FIG. 4A demonstrates that the "logical" layers of the full-stack architecture may have multifaceted physical implementations, and may themselves be decomposed according to the same layering scheme depicted by the system as-a-whole in FIG. 2 and FIG. 3. In this case, as in others to follow, the administrative and management functions of this component are also distributed across the preferred enterprise architecture stack. FIG. 4A provides A full-stack architecture diagram of only the Level 200 ("Big Data") component of the overall solution depicted in FIG. 3 is presented, including its administrative and management aspects that are omitted from FIG. 3 for clarity. In an example embodiment, this component is referred to as "ForeverDB"; however, this logical architecture diagram applies to other physical embodiments as well.

One thing to note in FIG. 4A is that the subcomponents of which ForeverDB is itself composed also reside at specific layers of the architecture stack, each according to their purpose, consistent with the design of the system as a whole. Advantageously, this design allows the various architectural components (of which ForeverDB is one), to be deployed standalone, as part of an on-site implementation, or as a service in externally managed data centers (aka, "the Cloud").

ForeverDB provides an administrative database 411. This database is separate from the one 410 depicted at level 400 ("Data") in FIG. 3, whose purpose is to maintain data related to workflow instances for a given instance of domain cache 240 (and is discussed more fully with reference to FIG. 10). By contrast, the database 411 stores data about the overall ForeverDB instance itself, such as all Domains, and their related storage and domain cache facilities, users, permissions and other metadata. Advantageously, a single instance of ForeverDB can provide long-term storage and domain cache services for multiple Domains within an organization; and each Domain can have multiple domain cache instances that service discrete sub-organizations.

ForeverDB provides a front-end web service 511 that features a web-based API with multiple network endpoints for client front-ends to access the data in 411. Endpoint types may include, but are not limited to, REST, SOAP, GraphQL, SQL and SPARQL. Which endpoints for a given instances are permitted, and how they are configured, is determined by local network administrators, the primary users of the management console.

ForeverDB's management features have business logic defined in component 611, that acts as a workflow and validation layer for activities in the management console, located further downstack. Advantageously, this design permits the business logic of ForeverDB's administrative functions to be consistently applied, regardless the nature of the client.

Level 700 ("Application Logic") in FIG. 4A represents an advantageous feature of the present approach. As noted above, ForeverDB's management and administrative functionality can be accessed consistently by diverse client front-end consoles. Each of these have application logic specific to their operational semantics, hence they reside in different sub-components: namely, 711*a* and 711*b*.

Application logic at 711*a* pertains mainly to web-based clients 811*a* in a web browser. Typically, web applications manage state either server-side or client-side, because the connection over HTTP(S) protocols is by definition stateless. Different embodiments can take either or combinations of both approaches, depending on the design of the client front end. Different embodiments support different strategies, from template-based generation of HTML per page, to a single page application, or a combination of the two (in which a portion of the HTML page rendered via templates is mounted by a SPA). Application logic at 711*b* pertains alternatively to desktop 811*b* or mobile "Internet of Things" (IoT) 811*c* clients, which are stateful and typically communicate directly with the web service 511, incorporating business logic module 611 in their code.

ForeverDB as a standalone database service supports all these front-end client types. Apex DomainMaster, which embeds ForeverDB as module for consumer customers, supports only the desktop and mobile IoT clients. Other combinations are possible, as new modalities for client interaction and user experience emerge over time. Advantageously, the present approach is agnostic with respect to input modalities, and in every embodiment offers extension points for adapting to new ones.

Referring back to FIG. 3, it will become clear that nearly all of the major components up and down the architecture stack repeat this logical design pattern intentionally. Advantageously, this consistency of design allows the system to be deployed as a bundle, or separately, either on premise or hosted externally. In the interest of avoiding unnecessary repetition, and as appropriate, the detailed descriptions for the remaining components will refer back to this discussion of FIG. 4A.

We turn our attention now to FIG. 4B, which provides a view into the long-term storage aspect of ForeverDB and other embodiments of component 220. The purpose of this component is to provide durable, distributed storage of an immutable, append-only history of domain events. This is one of two components in the system that makes use of blockchain technology as part of the overall solution; the other is the "SYNC DB" 410 in FIG. 3, which will be discussed in relation to FIG. 6 and more particularly FIG. 10.

Still referring to FIG. 4B, we see that both the distributed transactor 310 and the domain cache 240 interact with the storage agent 221, but not the master identity index 230 with its related identity resolution service. This is an important observation as all data stored in long-term storage provided by 220 is guaranteed to be anonymized by design. The identity transaction map 222 is a strictly internal component that relates only surrogate keys provided by the transactor to physical storage locations managed by the storage agent, in order to provide reliable data retrieval on demand from either the transactor 310, when constructing the next block on the blockchain in flows 908*b* and 907*a*, or the domain cache 240, when reconstructing the state of an identity managed by the system after the next block is appended to the blockchain in flow 908*a*.

Advantageously, the built-in surrogate key management feature of 220 means that data stored in 225*a-n* is thoroughly anonymized and cannot be reconstructed without independent, privileged access to the master identity index and identity resolution service 230 (which, of course, 310 and 240 have). This means that it is completely safe to store data files 225a-n on physical storage that may be accessed publicly or otherwise compromised without fear of revealing protected information (for those domains that require protecting certain data), so long as access to the master identity index 230 is strongly secured.

As data in 225a-n grows theoretically "forever" it is important to find low-cost, possibly public and in any case elastic storage for this information, and to protect whatever is stored there as appropriate to the Domain. This clean separation between 220 and 230 ensures that data in 225a-n is utterly meaningless to outside observers, consisting of compacted collections of deeply interrelated keys referring back to unknown data. Moreover, 230 is designed such that each instance of a ForeverDB Domain generates cryptographically unique surrogate keys for all identities stored in its copy of 225a-n, so each participating organization's copies of the 225a-b will refer to entirely different surrogate keys at the storage layer, further frustrating potential hackers.

Another advantageous feature is a flexible journal file partitioning scheme that allows designers of Domains to specify the scope of one or more storage units 225, referred to in an example embodiment as "Domain Journals." They are independent blockchains of data related to one or more (or even all) identities in the Domain, representing an immutable list of transacted events updating state to the identities in scope for a given journal over time. ForeverDB and other embodiments provide the Domain designer with considerable flexibility to decide how these chains are partitioned: by single identity, by groups of identities, or by characteristics determined by a custom ontology. Moreover, maximum size per journal file can also be specified at Domain creation time to facilitate a variety of archival and file management policies and strategies. In the case of specific journal file size limits, the system advantageously manages the seamless transference of "write" mode to a new journal file when the current one "fills up" and is archived then as "read-only." From the moment a journal file is archived, it can only ever be read from; writes only ever are appended to the "current" journal file node (referred to as "225n" in the FIG. 4B).

The "blockchain" nature of storage units 225a-n is revealed in the drilldown into 225n. To be a valid blockchain, each "block" needs to contain a hash of the previous block's data. This is done in order to make it easy to verify that the data in the entire sequence of transacted blocks has not been modified or tampered with in any way: this is the major promise of blockchain data structures. It is trivial to recalculate the hash from the metadata provided, and if it is not the same, then it follows that something in the data changed since it was originally computed. Bitcoin adds levels of computing complexity in its use of blockchain that are often conflated with blockchain itself, including its choice of metaphor (i.e., "distributed ledger") to describe the transaction data specific to its domain (cryptocurrency and finance). Therefore, given that the goal of our system is merely to ensure that each participant in the data sharing regime have exactly the same copy of the history of domain change over time, the underlying metaphor of the disclosed embodiments use of blockchain is not a distributed ledger but rather a distributed journal.

The present approach advantageously stores information in each data "block" of its blockchain in "the language of the domain." In an example embodiment, this language is expressed in a fact-based format based on the WC3 standard Resource Description Framework (RDF) referred to as "triples" because of the tri-part nature of RDF "facts" (consisting of: subject, predicate and object). However, each triple either asserted or retracted in a given domain event transaction is reified and a cryptographically unique identifier set is stored in its place. This achieves two objectives: a compact representation of the information that is inherently secure (by obscurity), and an elimination of duplicate information even in the presence of repetitive assertions.

Once reified and given an identifier, future reifications of the same triple can re-use the identifier, greatly reducing the information bloat associated with large triple stores in embodiments of the disclosed invention. A reified factstatement, or assertion in the language of one example embodiment, can be asserted or retracted multiple times over time, and this is important metadata used downstream; but it need not duplicate information to be established in each transactional context in which it appears because the identity resolution service of the master identity index 230 provides the key mapping of assertions to their composite triple elements, each of which are also given identity in the system and reused as much as possible. Therefore, as shown in FIG. 4C, in order to reconstruct the information stored in 225a-n, the interpretant must have privileged access to the actual datums to which the keys refer, which is precisely what the domain cache 240 does when it receives notification 908a of new information being added to long term storage managed by 220.

More specifically, it consults with the Master Identity Index's Identity Resolution Service 230 to reconstruct the domain event, with additional metadata and possibly inferred new knowledge computed at transaction time, sufficient to update the known-good state of the relevant managed identity in the cache. This in turn causes any subscribed Synchronicity instances, receiving notification of this change via 910, to further propagate the state change to each SOR that maintains related information about that managed identity. Advantageously, the full power of reasoning capabilities of RDF, OWL and related linked-data technologies can be brought to bear on identifying and resolving any discrepancies in need of non-trivial reconciliation which, as it happens, can also generate new knowledge that must be propagated as a new transaction (the discussion of FIG. 11 will explicate this aspect more fully).

The disclosed approach allows the probability of error for each source of information across the entire network to be evaluated in real-time, continually, over time, and each change can be tagged with this assessment, which in turn improves inferencing and can permit non-sequential backtracking to root out other bad derivative information over time. This automated process of continually re-evaluating truth about the state of every managed identity as it happens, in light of everything that has been verified true (or false) before, is an important and advantageous aspect of the present approach.

Advantageously, the disclosed approach uses this strategy to add three new pieces of information to every triple: its provenance, the transaction context in which occurred (including, importantly, the time it became known to the system, independent of the time associated with the information from the system of record that produced it), and whether the triple is considered "true" or "false" in that context (based on whether it is being asserted or retracted). This layering of the dimensions of time and truth with other metadata about the origin of the information greatly expand the information model of RDF, and is an important aspect that makes it uniquely suitable now to tackle the otherwise intractable problem of reasoning about truth in the presence of multiple sources of truth that are incorrect and/or disagree about what is true.

Referring now to FIG. 4C, as alluded to previously, this diagram describes in more detail the high-level process by which new information is stored in long-term storage 220 by the distributed transactor 310 in the course of receiving change notification message N from one of a variety of sources of truth via flow 905a. The diagram also shows the process by which information is retrieved from long-term storage by the domain cache 240, correlated against the identity resolution service of the master identity index 230, and reconstructed in order to create a diff (or "differential"), if indeed any diff needs to be applied to its view of the state of related identities affected by transaction N. This diff, if any, is then propagated further to the synchronizer 510 via flow 910.

Flow 905a represents a message sent from some source of truth attached to a specific SOR (i.e., 320a-d in FIG. 3) or the synchronizer 510 itself, to the transactor service 310 through any of its publicly available endpoints (UDP, TCP, HTTPS, etc.). The content of the message is an RDF graph describing the novelty that has been introduced by some change detected or otherwise observed in the course of normal business operations according to the domain schema (or "ontology" using the term of art specific to RDF).

Still referring to FIG. 4C, this message enters a distributed queue service 310a in the order in which it was received, pending processing. In some embodiments, this queue is coordinated with multiple 310a instances in order to ensure novelty entering shared domain journals (i.e., blockchains) is consistent in all replicas.

At some point the message N received via flow 905a is pulled from the distributed queue 310a in flow 905b for processing. This occurs when the local transactor processor 310b is called upon by the network consensus algorithm determined at Domain construction time (different embodiments offer different defaults and options) to process the next message and all other messages in front of N have already been processed. At this time the distributed transaction processor 310b interacts with the identity resolution service of the master identity index to augment the transaction context information, reify all triples (or otherwise reuse identifiers associated with previous reifications, which is the default policy), compute its hash for association with the next "block" of each blockchain affected by this transaction, and otherwise prepare the message for long-term storage in accordance with local policy. As an example, security policies may involve encrypting certain identifiable information in the master identity index to further secure sensitive data.

The output of this process 906a is sent to the storage processor 310c, whose responsibility is the orderly storing of one or more blocks associated with one or more journals. The present approach permits partitioning of domain information into one or more journals, implemented as independent blockchains, according to the rules of the domain for identity management. Thus, a single change message N may in fact add blocks to more than one blockchains managed by the storage agent 220. In cases where this is true, the storage agent further ensures that the previous hash associated with each distinct journal entry matches the hash of the last block on each journal blockchain affected by the transaction, and a mapping of affected blocks on related journals is made in the identity transaction map 222 from FIG. 4B. In this way, and still referring back briefly to FIG. 4B, a whole-system view of transaction state across multiple journals allows the storage agent 221 to send related change information at arbitrary depth levels automatically to domain cache instances via flow 908a and on demand to the transactor via flow 908b.

Referring again to FIG. 4C, in the process of sending the augmented blocks to the storage agent via 907a-b, the storage processor advantageously transforms the information into an efficient, compact and completely anonymized representation suitable for long-term storage, even on public, commodity or containerized infrastructure. The job of the storage agent 220 at 907c is to append the new block(s) to the relevant journal(s) and, as noted above, keep a meticulous accounting of the affected journals and identities (by their anonymized IDs) per logical transaction. Finally, in flow 908, the storage agent notifies all subscribed domain cache instances 240a-n of novelty.

Each domain cache instance 240 interacts with the Identity Resolution Service of the Master Identity Index 230 upon notification of an update to one or more domain journals of interest (different domain caches have their own mapping of relevant identities, as described with reference to FIG. 4D) to determine if the new information that has been introduced results in a change of current state to one or more identities of interest. It is possible the new information was introduced by an external system that was out of alignment, and the "new" information does not affect an alteration to the state of the managed identity under consideration in a given instance of the domain cache. In this case the update can be ignored. Once the domain cache processor determines there is a "diff," however, it promptly notifies all of its subscribing instances of the synchronizer as part of the propagation scheme of that differential via flow 910a-b.

Figure 4D:
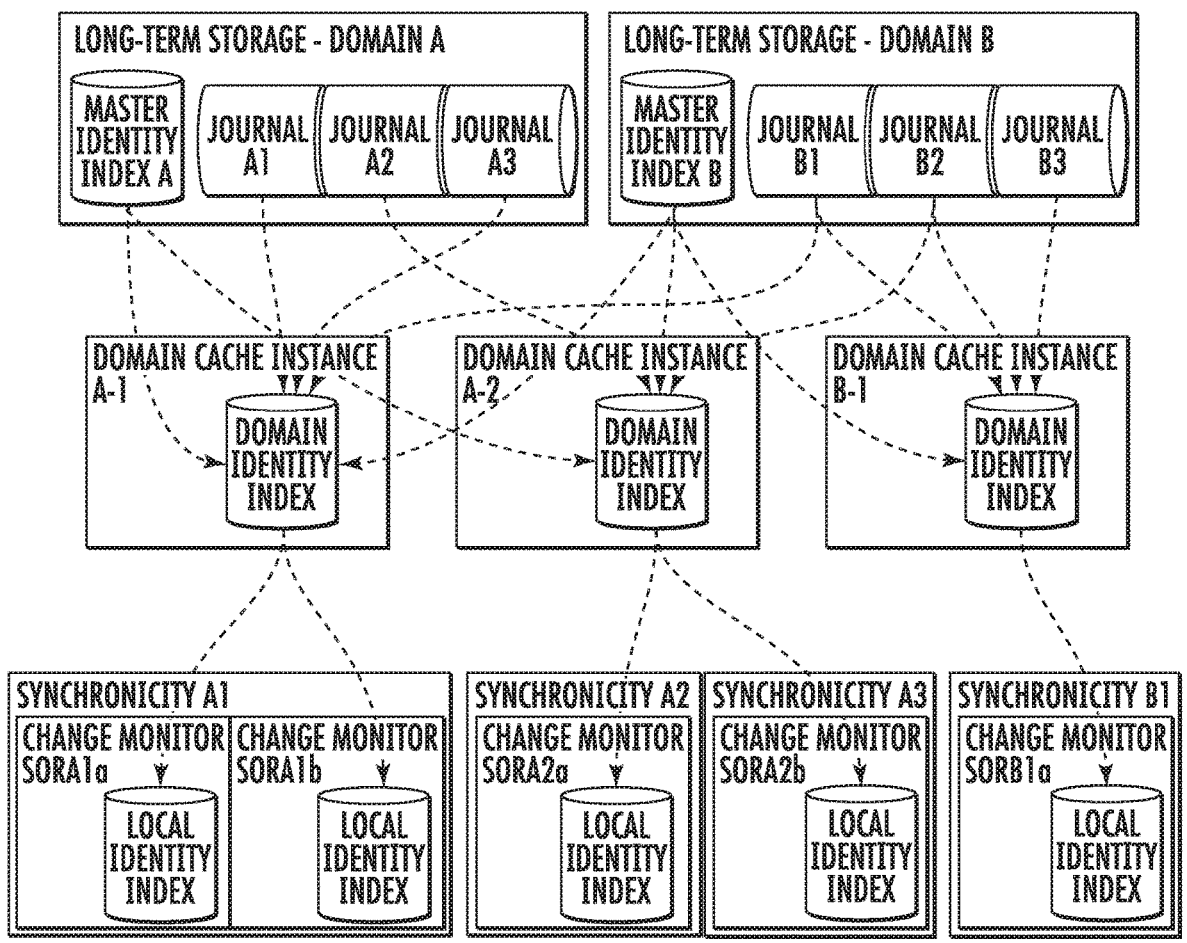
FIG. 4D is a schematic block diagram providing a conceptual view of how data may be linked across multiple domains without violating the semantics of the dataflow in accordance with an example embodiment.

Turning now to FIG. 4D, this is a schematic block diagram providing a conceptual view of how data may be linked across multiple domains without violating the semantics of the dataflow in accordance with an example embodiment. The composability of domain knowledge is advantageously used to permit practical cross-domain information sharing in support of numerous different types of organization structures. As has been mentioned previously, the augmentation of RDF with the dimensions of time, truth and provenance unique to the example embodiments makes it possible to link data across minimally related domains for the purpose of maintaining discrete sources of truth, represented by the domain cache 240 for the purpose of local synchronization of change. For this reason, RDF is often referred to today as "linked data" as a preferred term of art, even over "semantic web" (which was the prior term of art, still in use today). The present approach makes advantageous use of the "linkable" nature of RDF data by enabling a sophisticated scheme for change propagation, even across organizational boundaries. This includes internal organizational boundaries, such as across subdivisions or wholly owned subsidiaries of the parent organization participating in the data sharing scheme of the present approach. Thus, another advantageous use for this approach is bringing disparate IT systems into alignment after mergers and acquisitions.

Notwithstanding the specific domain use case, an important point to note here is that a full deployment of the entire stack can facilitate a number of logical and physical configurations allowing for arbitrarily complex groupings of SORs according to one or more domains managed at the enterprise level. One ForeverDB instance can manage one or more Domains; each Domain can have one or more Domain Cache instances, usually scoped by sub-organization; and each Domain Cache instance can serve one or more Synchronicity instances, each with one or more managed SORs.

This is facilitated by a scheme of identity mapping with three layers: The "master" identity index at the "Domain" level; the "domain" identity index at the Domain Cache level (which would practically speaking be scoped to one or more discrete enterprises within a large distributed organization), and a "local" identity index at the individual SOR layer, scoped by participation in a specific Synchronicity instance.

Consider Domain Cache Instance A-1. It links data from Domains A and B into its Domain Identity Cache. This means that the Synchronicity instances under its purview, namely Synchronicity A1, A2 and A3, each can make available to their SORs any identity updates relevant to them from either Domain A or Domain B. Note, however the following subtleties: Domain Cache A-1's identity index tracks changes from identities with data tracked in journals A1, A3 and B1, but Domain Cache A-2 tracks changes from identities in journals A2 and B1. The point is that the enterprise may fine-tune what data is shared, and with which SORs it is shared, at a fine-grained level, even when change is propagating from two logical domains.

Now consider Domain Cache B-1. It receives all data from Domain B, and none from Domain A, even though Domain B data is shared transparently with Domain A higher up the stack. Moreover, Domain Cache B-1 has only one Synchronicity client, with in turn only one SOR under management. Descending from these abstract heights, we can concretize this example by imagining a healthcare use case, in which Domain B represents a system of status or medical codes, and Domain A represents insurance providers. There is no use for specific provider information in Domain B: its only purpose it to manage thousands of categories of status codes, which get updated, refined, and retired continually. But Domain A does have use for one or more kinds of status codes managed by Domain B, particularly claims status codes, and specialty codes (two of several kinds of codes managed by Domain B).

Some systems in Domain A manage provider data specific to line-of-business specific directories, where the specialty codes are important; others care only about insurance claims processing, and so they care only about claims status codes. As either code set changes in Domain B, relevant SORs across business divisions within Domain A can be updated automatically with new codes or updated descriptions of existing codes when a user of SORB1a updates them. Similarly, when systems in Domain A related to claims processing update a provider address or other demographic, those systems in Domain A that process directory information can be updated, and vice versa. Advantageously, the example embodiment provides precise auditing of which changes caused which updates to propagate across the entire system, making it easier to perform root cause analysis when bad data is entered by a user or incorrectly inferred by the system. This means faster detection and resolution not just of discrepancies but also errors and omissions, compared to the current state of the art.

Figure 5:
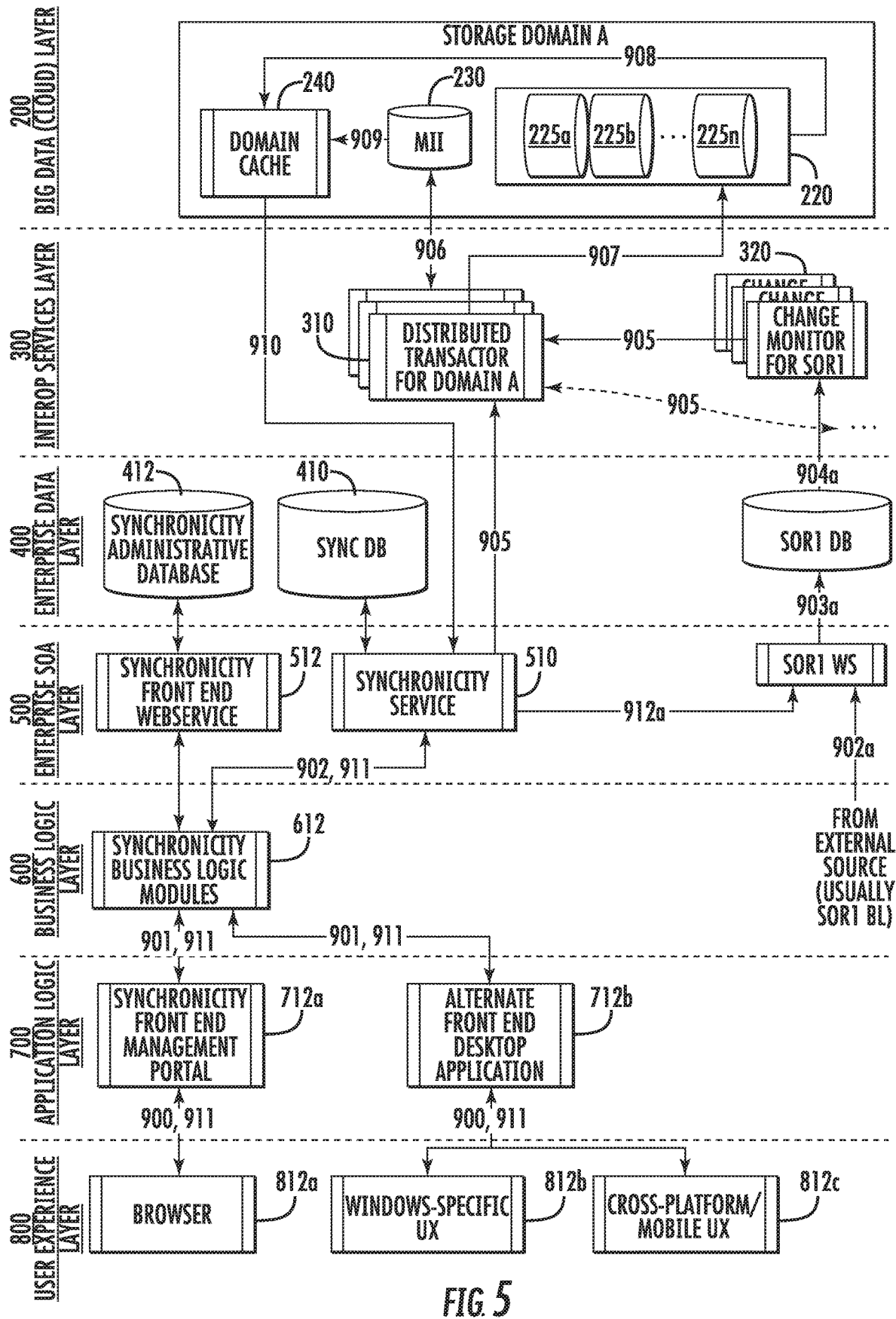
FIG. 5 is a schematic block diagram of the synchronizer interacting across Interop Services, Enterprise Data and Enterprise SOA layers from FIG. 3 in accordance with an example embodiment.

FIG. 5 is a schematic block diagram of the synchronizer interacting across layers 300-500 ("Interop Services", "Enterprise Data" and "Enterprise SOA," respectively) from FIG. 3. Administrative and management portal components are depicted, as in FIG. 4A for ForeverDB, on the same architecture. In some embodiments, this component is referred to as Apex Synchronicity; in others, Apex InterOp. Notwithstanding the reference to either Apex Synchronicity or Apex InterOp, or names given to other embodiments, the same schematic applies. FIG. 5 represents a whole-system view of the synchronizer component 510, referred to in the example embodiment as "Synchronicity." Much of the discussion in FIG. 4A applies here, inasmuch as the components shown from the data layer down perform administrative and management functions for this component, following the same architectural patterns as "ForeverDB" in FIG. 4A.

One point worth clarifying is that the Synchronization Service 510 is logically distinct from the Synchronicity Front-End or Administrative Service 512, although they could be located on the same physical node to simplify deployment of a concrete implementation of the full stack. The Synchronicity Service 510 deals with orchestrations of data flows between domain cache instances and SORs, whereas the Synchronicity Front End Web Service 512 is concerned about administrative and management issues related to the given instance of Synchronicity itself. Likewise, the databases 412 and 410 are logically separate, but could be combined in a given implementation of one or more embodiments of the disclosed invention.

Figure 6:
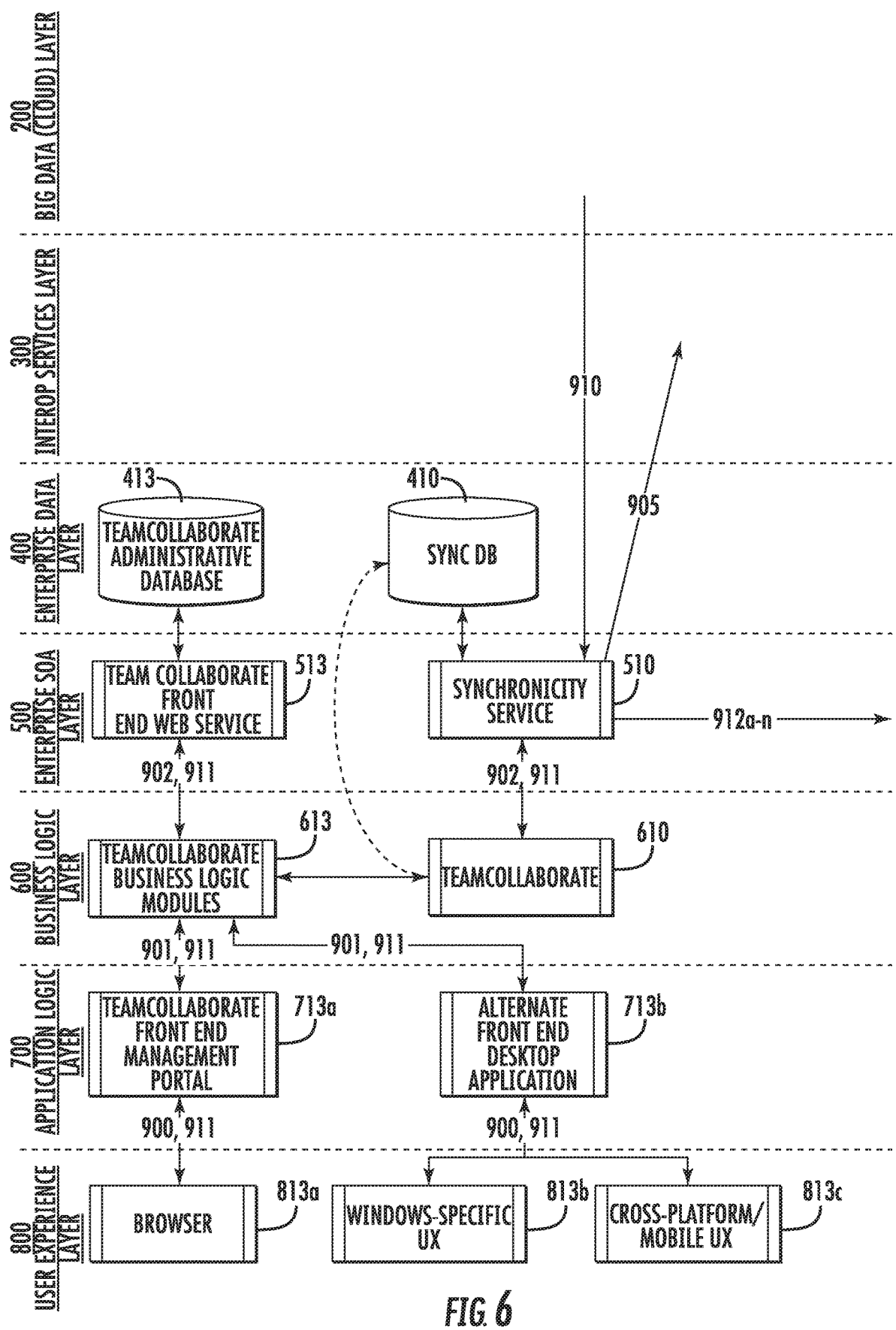
FIG. 6 is a schematic block diagram of the Business Logic layer from FIG. 3 shown in greater detail in accordance with an example embodiment.

FIG. 6 is a schematic block diagram of the layer 600 ("Business Logic") from FIG. 3 in greater detail, with particular focus on the reconciliation workflow service 610 administrative and management functions, in accordance with an example embodiment. In some embodiments, this service and related management components are referred to as TeamCollaborate. FIG. 6 represents a whole-system view of the reconciliation workflow component 610, referred to in the example embodiment as "TeamCollaborate." Much of the discussion in FIG. 4A and FIG. 5 applies here, inasmuch as components shown from the Big Data Layer down the full stack perform administrative and management functions for this component, following the same architectural pattern as "ForeverDB" and "Synchronicity" in those related figures.

The same clarification made for FIG. 5 above applies here, but with one nuance. Notice that the TeamCollaborate service 610 is a business logic component in the context of the full stack. Nevertheless, all interaction with it is governed by the Business Logic Module 613 for TeamCollaborate.

Figure 7:
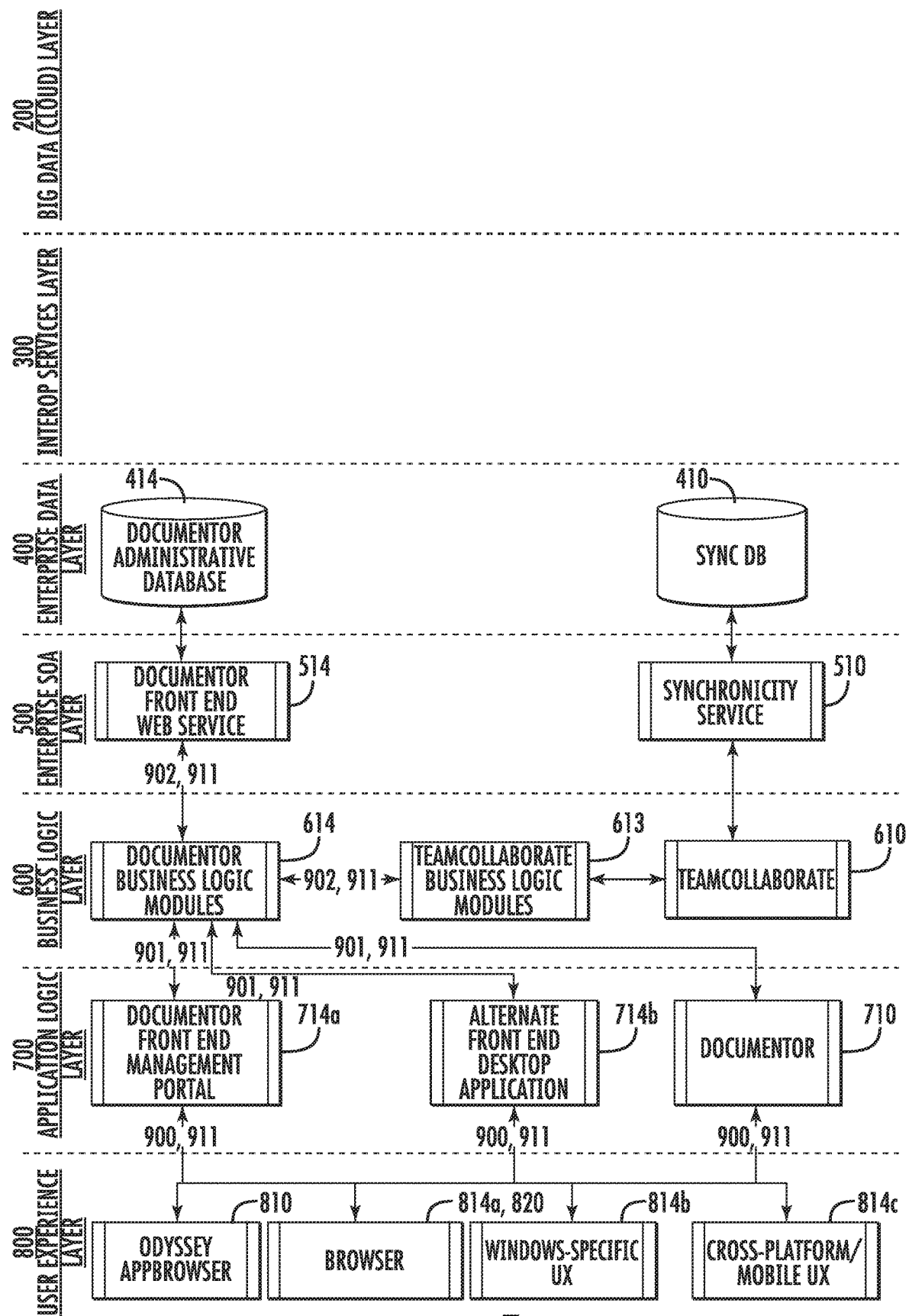
FIG. 7 is a schematic block diagram of the Application Logic layer from FIG. 3 shown in greater detail in accordance with an example embodiment.

Referring now to FIG. 7, this is a schematic block diagram of the layer 700 ("Application Logic") from FIG. 3 shown in greater detail, with particular focus on the workflow documentation component 710 and its role in data flow 911, as well as its administrative and management functions, in accordance with an example embodiment. In some embodiments, this is referred to as DocuMentor. Here we see a whole-system view of the DocuMentor 710 component from FIG. 3. Much of the discussion in FIG. 4A and FIG. 5 applies here, inasmuch as components shown from the Big Data Layer down the full stack perform administrative and management functions for this component, following the same architectural pattern as "ForeverDB," "Synchronicity," and "TeamCollaborate" in those related figures.

Note as we descend down-stack that lower-level components have less and less visibility into the higher-level components up-stack. DocuMentor's only real interface to the world above is through the TeamCollaborate Service 610. It does not meaningfully interact with TeamCollaborate's administrative features, and also communicates with 610 via its Business Logic Modules 613. Synchronicity Service 510 and SYNC DB 410 are shown only for context. Nothing in DocuMentor interacts directly with those components.

Still referring to FIG. 7, note that DocuMentor service 710 has access to the full range of UX options in the 800 ("User Experience") Layer, though its main concern is processing of actual documentation sessions related to ongoing reconciliation workflows managed by TeamCollaborate 610.

It should also be noted that consistent with observations related to FIG. 4D, instances of Synchronicity in example embodiments can service one or more instances of TeamCollaborate, and instances of TeamCollaborate can service one or more instances of DocuMentor. However, unlike the components further up the stack, which maintain identity state in a tightly controlled flow of new information, instances of TeamCollaborate can connect to multiple instances of Synchronicity and instances of DocuMentor can connect to multiple instances of TeamCollaborate. Workflow and documentations sessions related thereto only ever "belong" to one logical instance of Synchronicity, but there is no reason a user with access to more than one for business-related reasons cannot use a single physical instance to connect to all of them. This may be advantageous in very large implementations involving highly segmented organizations, in which some users may frequently need to work across business lines.

Referring now to FIG. 8, this is a Venn diagram illustrating a conceptual framework for the three-stage workflow strategy associated with the systems and methods set forth herein in accordance with an example embodiment. This reveals both the nature of the interoperability problem, even in a perfect world where all IT organizations have a perfect copy of information about all entities in the domain, and the manner in which the three-stage workflow sessions depicted in FIG. 10 generate new knowledge independently of the pre-existing (and often limited) interfaces of the managed SORs. FIG. 8 provides a highly conceptual representation of the interoperability problem in the form of two convergent Venn diagrams that are intended to highlight both the motivation for the above-described approach as well as the workflow design thereof is provided that deals with the manner in which new information begets new information through the three-stage process noted above.

The top three circles 1000, 1003 and 1004, represent three distinct IT Organizations ("A," "B," and "C," respectively), or to be more precise, the three exact copies of all domain knowledge stored in each organization's perfect copy of the raw elastic blockchain component 220 of FIG. 2 and FIG. 3, at any given point in time.

The nature of the interoperability problem, or rather, the motivating challenge underneath the desire for interoperability as expressed by industry, is understood by the areas of overlap, 1001, 1002, 1005 and 1006. 1001 represents the subset of all identities in the domain shared in common only between 1003 ("B") and 1000 ("A"); 1002 represents the subset of all identities in the domain shared in common only between 1000 ("A") and 1004 ("C"); 1005 represents the subset of all identities in the domain shared only between 1004 ("C") and 1003 ("B"). 1006 represents the subset of identities in the domain shared commonly between all three organizations.

But for the regions of overlap in FIG. 8, there would be no data sharing problem in search of a general interoperability solution. However, such overlap is guaranteed in any service-based industry involving identities who are free to avail themselves of services of multiple service vendors/providers, as is the case in the exemplary domain of "practice management" generally.

It is also a reality in every service-oriented domain that changes to the state of human identities cannot occur in multiple locations or under the auspices of multiple organizations simultaneously (because, as anyone knows intuitively, people generally cannot be in two places at once), a fact used advantageously by the present approach to permit simple proof of stake aka provenance-based proofs for the purpose of obtaining consensus transacting domain events on the shared blockchain. This makes consensus problems considerably simpler than in other blockchain-powered domains, such as bitcoin. However, as should be evident, the exact kind of proof required by a given domain will vary, and for this reason, multiple embodiments of this aspect are permitted here, as elsewhere, by configuration of "consensus adapters" at 906 in FIG. 3 for this purpose. Whereas "distributed ledgers" deploy "smart contracts" for transfer-of-funds logic that are required to execute across the blockchain, the present approach provides facilities for consensus logic and domain constraints to be coded to the "distributed journal" concept as implemented in the example embodiments.

The second half of the Venn diagram in FIG. 8 includes circles 1000, 1200 and 1500. 1000, as noted before, is Organization "A"'s perfect copy of all domain knowledge of all identities in the domain. 1200 represents the subset of all domain identities relevant to Organization "A" obtained from 1000 and stored in the A's Distributed Domain Cache 240. The size of the circle is not significant, but rather the quality of being relevant to the organization. 1500 represents all other data stored in SORs that IT Organization "A" uses to transact all business pertaining to the subset of the identities of the domain 1200 that are relevant to the organization. Similar circles to 1200 and 1500 could also be drawn for Organizations represented by domain copies 1003 and 1004, but are omitted for clarity.

The areas of overlap between 1000, 1200 and 1500 are what drive the three-stage process of data reconciliation provided by embodiments. The focal point of reconciliation is an "encounter" 1300 that drives resolution of conflicting information usually through direct interaction between one or more service providers representing the Organization and the service recipient whose data has been discovered to be out of alignment between one or more systems or organizations.

The three stage process is implied in the flow of data (which is by design unidirectional) in series 900. Encounter data flows managed by the Reconciliation Workflow Service 610 and Reconciliation Documentation Service 710 are represented by 911a-911g in FIG. 2 and FIG. 3. 1100 represents the first logical phase of the process, when data for the encounter is assembled from 240 and the service provider(s) prepare for the encounter. 1400 represents data that is obtained during the interaction phase of the encounter (and "point of service" in this context is understood broadly to mean either at a physical location or over the phone or Internet-of-Things). At the beginning of this encounter the idea is to "tell the story" of the service recipient's state, how it got to be what it is, but by the end of it, through questioning and observation, new relevant facts are obtained by the service provider(s), awaiting formalization. This formalization of the definitive documentation of the encounter is represented by 1600, the official close-out of the encounter, when new facts are submitted, including any decisions falling out of the encounter, which are also recorded and then shared across all participating networks on the blockchain. Thus the three phases involved in reconciliation of data and basic encounter workflows provided by the embodiments in summary are: Preparation, Encounter, and Close-Out/Decision.

Figure 9:
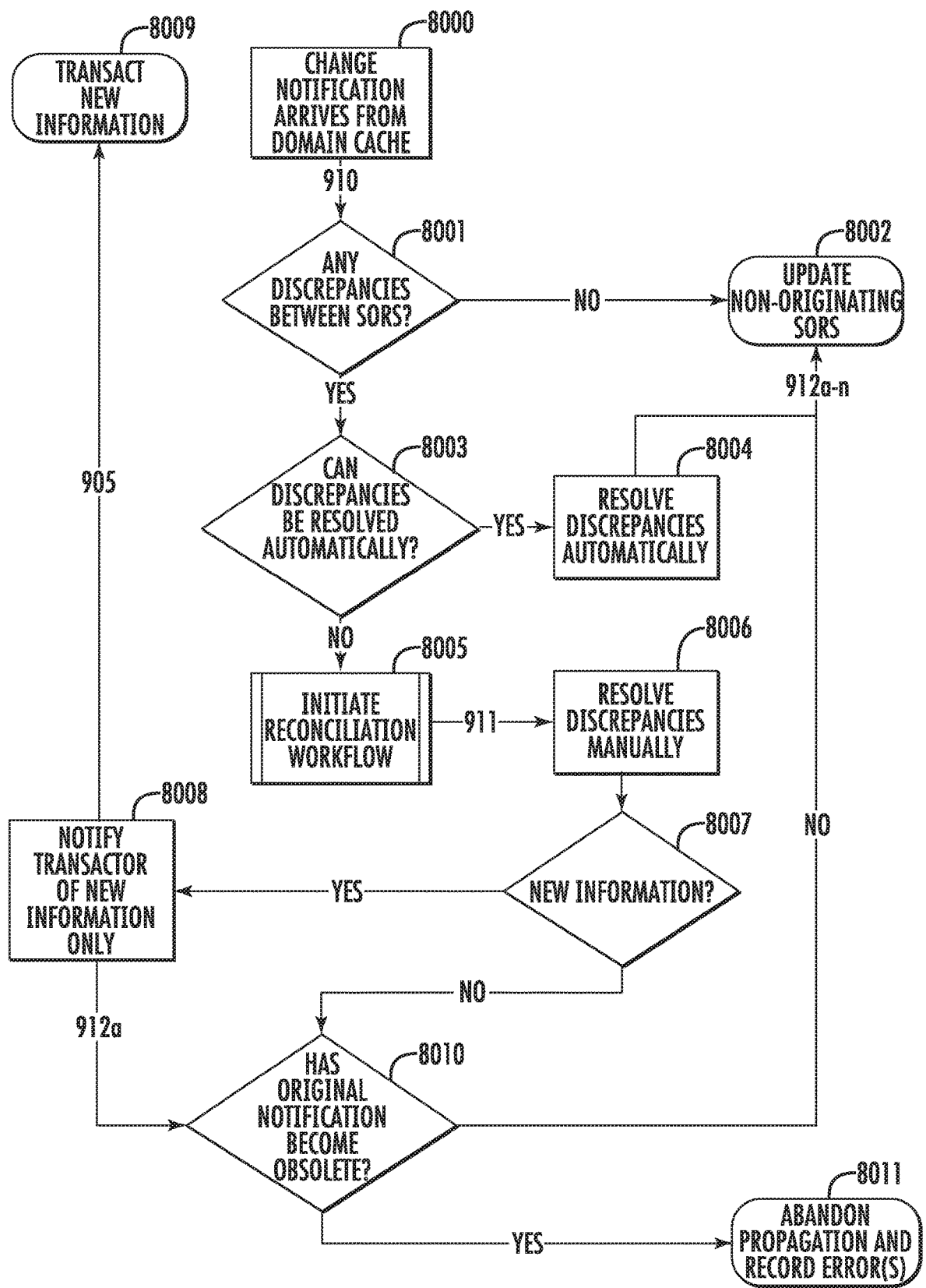
FIG. 9 is a flowchart illustrating exemplary propagation method aspects in accordance with an example embodiment.

Turning now to FIG. 9, this is flowchart illustrating exemplary propagation method aspects in accordance with an example embodiment. Advantageously, the workflow algorithm may be customized to the needs of the domain. Such customizations are not just domain-defined; very often they are further constrained by local enterprise exigencies and established enterprise policies that require implementation in the course of every workflow as well, policies that may not apply to other external participants in the data sharing scheme. In all cases their objective is the same: to prevent "bad information" from overwriting "known good" information. Here a process diagram depicting flows 911-912 from FIG. 3 is provided. More precisely, this diagram represents the high-level algorithm for the manner in which novelty propagated by a Domain Cache instance 240 to a synchronizer instance 510 in flow 910 is further propagated to the SORs under its management. The main task is to prevent bad data from overriding good data, the components from FIGS. 5, 6 and 7 are participants in this process.

There are broadly speaking two kinds of discrepancies that can require attention during this process: those that can be handled by a clear business rule that present no condition or situation that affects other business rules that may apply to the information in flight, and those that cannot. Usually, the latter kinds of discrepancies involve externally sourced information that is different from local information, or internal misalignment caused by some other factor (e.g., human error). Another consideration in this context is that as discrepancies are resolved manually, the reconciliation process can generate still newer, more correct information than is known by any SOR under management, in which case such new information needs to be sent to the transactor to follow the same path outlined for all novelty entering the system. Advantageously, the disclosed embodiments in this way can provide the consistency required for the state of any managed identity to be reasoned about at any transaction point in time.

With this in mind, we will now walk through the process depicted in FIG. 9, referring back to previous figures as necessary. Step 8000 represents the moment a new diff for a managed identity arrives at the Synchronicity Service 510 via flow 910. At this point, step 8001, the Synchronicity Service 510 compares the previous state of the identity to the new state in its Distributed Domain Cache 240 and decides if there are any discrepancies among all known SORs (both internal and, if configured to allow comparison) external.

If there are no discrepancies, then the diff is sent to all SORs under the Synchronicity Service's 510 purview that subscribe to changes for the identity in question, and the process terminates at step 8002 with flows 912a-n as per usual. At this point each change monitor 320x updates its managed SOR, and confirms alignment with the transactor (depicted in FIG. 3).

If there are discrepancies then at step 8003 the Synchronicity Service 510 may use configured rules and logic (supplied by subject matter experts through its administrative console 712a in FIG. 5) to determine if the discrepancies can be resolved automatically, or need to be resolved via a manual workflow involving some user in authority to decide the outcome. If there are, then at step 8003, a further decision must be made: Can the discrepancies be resolved automatically, by action handlers supplied by subject matter experts, or must they be arbitrated by users in the field? If yes, then at step 8004 these handlers or users in the field can make the necessary resolution to the discrepancy (for example, ignore the information from a particular source as it is determined to be out of date) and the change can then be propagated to step 8002. Otherwise, the Synchronicity Service 510 will initiate a possibly long-running reconciliation workflow at step 8005 which may require an encounter with (or about) the identity in question at step 8006.

Step 8006 represents a potentially long-running reconciliation workflow and its attendant documentation session. After step 8006 there is another decision that the system must make, namely, whether any new information was obtained in the process. Using a medication reconciliation use case to frame the matter, imagine in the course of a routine checkup to determine if an OxyContin prescription from one hospital was the same prescription referred to at another, or a separate prescription altogether (as part of an initiative to deal with the opioid crisis, for example), it is learned by the attending physician that the patient (who is the subject of this new information) also takes some other drug in the same opioid class that was prescribed by yet another clinic, a prescription that is not on record with the system anywhere. This new information needs to be added to the history of that patient, of course, but more importantly: it cannot yet be added to the SORs directly in the path of the current "new information" yet; rather, it has its own path through the same data-flow as depicted in steps 8008-8009. The rest of the "new information" can be relayed to relevant SORs so long as it has not been obsoleted by yet newer information, should any have arrived in the intervening time since the manual workflow was initiated. This notion is depicted in step 8010. If it has been determined to be obsolete, then step 8011 deals with the erroneous condition, usually by abandoning the update. Otherwise, once the definitive documentation for the encounter would be understood, the new information (sans any newer information obtained in the process) can be forwarded on to the managed SORs per step 8002.

Figure 10:
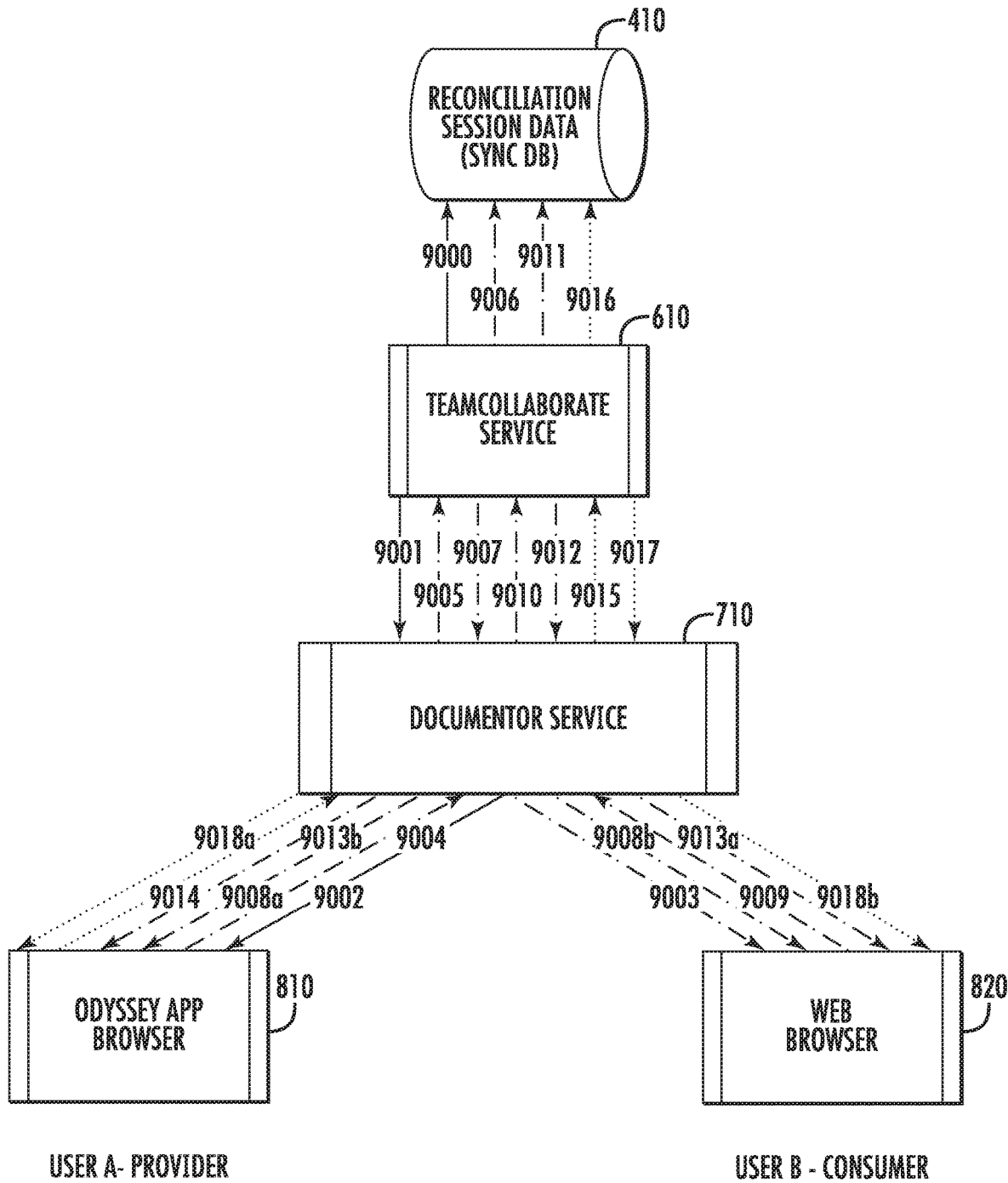
FIG. 10 is a schematic block diagram illustrating the User Experience (UX) layer from FIG. 3 in greater detail in accordance with an example embodiment.

Now we turn our attention to FIG. 10, which is a schematic block diagram illustrating layer 800 ("User Experience (UX)") from FIG. 3 in greater detail, with particular focus on the scenario-specific UX capabilities of 810 as facilitated by the documentation service 710 in concert with the reconciliation workflow service 610 storing session data in the synchronization database 410, in accordance with an example embodiment. For reference, the generalized 3-stage, multi-user, collaborative workflow presented in the 9000-9018 flows of this diagram (described later) occurs during manual discrepancy reconciliation steps 8005-8007 as depicted in FIG. 9. Advantageously, this provides a general approach to correlate multiple-user actions and entity state changes over the life of a reconciliation session for the purpose of general analytics including, but not limited to, usability, efficiency, effectiveness and other quality-related dimensions of team-based workflow activities.

FIG. 10 captures the interactions between the workflow and documentation subsystems in a reconciliation session intentionally simplified to emphasize significant features. Before stepping through this, let's consider the scenario, borrowed from the medication reconciliation example above. A physician has been alerted to a discrepancy regarding a patient's medication list, and an encounter is scheduled with the patient over the phone, in which the physician will consult with the patient about the medication list on file. Information has been obtained from external sources that the patient may be "gaming the system" to obtain opioids from multiple physicians, on account of chronic back pain from a car injury. (This is all just for-instance; another example could be contrived in the financial services domain, or any other service-related domain.)

The encounter will follow the 3-stage reconciliation workflow protocol (described more conceptually with respect to FIG. 8): preparation (identified by those flows with a solid line); encounter (identified by those flows with dash-dotted lines); and close-out documentation/decision (identified by those lines that are dashed only). The reconciliation workflow is initiated at step 9000, when the Synchronicity Service 510 initializes the session in SYNC DB 410 with all data related to the identity in question, including previous known-good information and the proposed new information (that includes one or more discrepancies that need manual resolution). This constitutes the "initial state" of the session.

It should be noted that the format of each reconciliation session uses blockchain technology in a similar manner to the long-term storage facility 220 of ForeverDB, and for the same reason, but for a different purpose. Although sharing the data is important, in this case, it is proof of the data's immutability and specifically the ability to demonstrate that the information has not been tampered with that is the primary motivation. Each and every state change by every participant in the session is recorded in order, such that the session data itself represents a kind of "black box flight recorder" of the session. In at least one embodiment involving precisely this use case, this approach was used to separate analytics concerns from UX and general database concerns cleanly and completely, where otherwise they would have been conflated by customer requirements. The result was a clean recording of every interaction of every user in multiple user interfaces relating to the same session, and in every case the desired analytic data points were able to be captured without interweaving the various related but independent concerns involved in the session from a software design point of view.

In a sense, this diagram may capture the essence of the system as-a-whole, except the scale here involves disparate UX's, not disparate SORs. However, considering that these are differences of scale (that is, details) and not of kind, the approach that worked in that context inspired many of the strategies in the example embodiments. UX's have state, as do SOR's, and the need to synchronize them in real-time despite their unique representation of the data in question.

The next step is for TeamCollaborate 610 to notify the physician of the new session. This is depicted by flow 9001. At this point, the task is assigned in 710 (by the system or an administrator, depending on configured policy) and the physician can open the session via his Odyssey Browser App 810 as depicted with flow 9002. Omitted for brevity are any number of interactions during the preparation phase of the encounter in which the physician explored the data and sought to shape the nature of the encounter discussion interactively in Odyssey. At some point the physician is ready for the encounter, which in this hypothetical example occurs over the phone at a prescribed time. The physician gives the patient a secure URL and a code to enter the session remotely using their browser, and the patient logs on via flow 9003. At this point, the UX for the physician and the UX for the patient have been initialized with the same data, but they are rendering completely scenario-specific views calibrated to the cognitive load tolerance and overall role of the users. For example, where the physician sees a list of medications, with one selected, the patient may see only the current selected medication.

At this point the physician updates information about one of the medications on the list in flow 9004. This causes DocuMentor 710 to send a message 9005 to TeamCollaborate, which persists the new computed state of the session via 9006 to the session blockchain. The new state is communicated back down through DocuMentor with 9007, and DocuMentor broadcasts it to 810 and 820 in messages 9008a and 9008b. Both UXs re-render, and now both users see the same information, according to their specific roles and cognitive requirements.

At this point the patient adds a comment upon prompting by the physician, which results in new state sent from their web browser 820 to DocuMentor via message 9009. This message is communicated up to TeamCollaborate service 610 via message 9010, and TeamCollaborate persists the state change it represents to 410 via 9011. Now the new state is communicated back down to DocuMentor Service via 9012, and both UXs are updated by DocuMentor via 9013a and 9013b, respectively. At this point, now both UXs uniquely render the current state including the patient's comment. At this point the physician is satisfied the session has resolved the purpose of the encounter and initiates close-out with flow 9014, the final state-change to the session representing the definitive end of the documentation session. Omitted for brevity are any conclusions or comments the physicians might add to this phase of the session. Message 9015 from DocuMentor to TeamCollaborate communicates this final state and it is persisted in message 9016 to the session record at 410. The final state of the session is now communicated back down from TeamCollaborate to DocuMentor via message 9017, which in turn communicates it to both UXs 810 and 820 via 9018a and 9018b, respectively.

It is important to note that the entire reconciliation session has been saved to a blockchain that represents every interaction between all entities in the incremental state changes that happened to the data during the session over time. This was a vastly simplified script to elaborate the key elements of this process, but one can easily imagine more complex interaction scenarios involving multiple web sessions, more than two participants and other variations on this theme in real world reconciliation workflows. Various embodiments can advantageously accommodate a wide variety of user analytic requirements entirely orthogonally from the reconciliation process itself.

Figure 11:
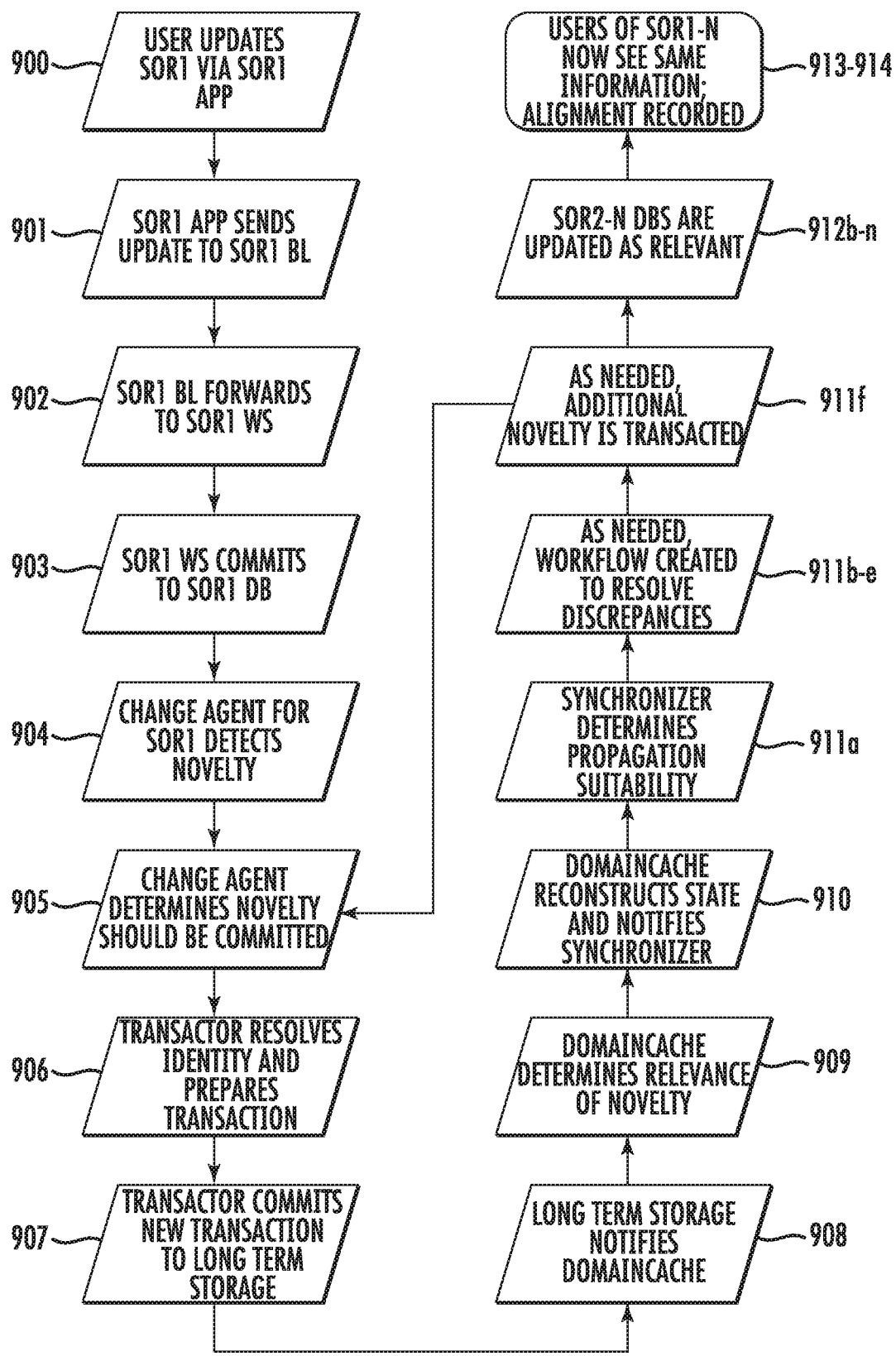
FIG. 11 is a flow diagram further illustrating the data flows shown in FIG. 10 in accordance with an example embodiment.

Referring now to FIG. 11, this is a flow diagram further illustrating data flows 900-914 and representing an example "round trip" method that is shared and synchronized across stake-holding SORs, in accordance with an example embodiment. Advantageously, this is characterized by a strictly unidirectional flow of data designed to help ensure the ability to reason about the state of the universe of managed identities at any transactional point in time.

FIG. 11 provides a high-level "recap" of the entire process from start to finish. This diagram focuses on the 900-series data flows, and represents one discrete change effected by a user of one of several managed SORs, pertaining to an identity managed by each of the SORs under consideration in the example. Assuming the components of FIG. 3 as the basis, the process starts when user of SOR1 updates some information about a managed identity via a web browser 820. (Refer back to the discussion of FIG. 3 where this process is elucidated.) SOR1 App 720a sends message 901a to SOR1 Business Logic module 620a, which in turn sends message 902a to SOR1 WS 520a. 520a commits the information to SOR1 DB 420a via message 903a. Change Monitor SOR1 320a detects, by the least obtrusive means available to the underlying database platform (these options range from triggers to subscriptions/change views or long-polling techniques, depending on the technology available), via 904a that this change represents actual novelty (and is not just propagation of known truth). Accordingly, via 905a the Change Monitor sends the transaction, with metadata defined by the implementation, to the distributed transactor 310.

The Transactor 320 resolves identity data and metadata and prepares the transaction for submission after consultation with the Master Identity Index and its Identity Resolution Service 230 occurring in flow 906*a*. The transactor commits the new transaction (which as noted previously may consist of multiple journal updates) via 907*a*. Long-term storage 220 updates the required journals and its internal identity transaction map, then updates all connected Domain Cache instances via 908 that information has been updated system wide. The distributed cache then consults with the identity resolution service 230 at flow 909 to reconstruct the new state changes and applies them to the new definitive state of the related identities as of that transaction point. As necessary, the Domain Cache notifies each participating synchronizer service instance 510 of the differential via flow 910, and each synchronizer determines propagation suitability at flow 911*a* to each SOR under its purview. Also as necessary, a manual workflow is initiated to record automated and/or manual resolutions to any conflicts via flows 911*b-e*, and if any new information is further discovered during this process it is whisked off to the transactor via flow 905 as if from any other change agent monitoring.

At this point, should the new information not be obsoleted, it is sent to each of the non-originating SORs (in this case SOR2-SOR4) via their respective web services in flows 912*b-n*. Finally, each of these systems record the fact of their alignment to the state of known truth about the identity under consideration as of the current transaction point via flows 913*b-d* through 914*b-d*. At this point, all systems under record have been aligned with the new information, and any additionally new information discovered in the process is in the same pipeline.

It should be noted that this process will occur at all nodes on the network of data sharing organizations simultaneously in real-time, and at each step each participating organization has autonomy to decide many fundamental policies regarding state propagation, such as what to automate, what to accept/reject as external information is merged with local information, etc. These policies may conflict or create new discrepancies, but over time the system will become stable as universal data about each identity propagates uniformly to participating SORs and the change management problem is simplified by practical exigencies (for example, in one embodiment specific to the healthcare domain, the fact that the patient can only be in one healthcare facility at a time renders it unlikely, if not inconceivable, that two separate collaborating healthcare networks will send visit-related data to the system at the same time).

The foregoing thereby advantageously provides a cohesive set of tools, techniques, methods and computerized software components that, taken together, provide both the necessary conceptual approach and a distributed physical infrastructure to satisfy the difficult technical requirements for data sharing according to the information technology (IT) term of art known as "semantic interoperability." The disclosed approach provides numerous semantically-rich interoperability-related capabilities in a domain-neutral, unobtrusive fashion, primarily through architectural innovation involving, among other things, the use of blockchain technology. The disclosed methods compare and contrast in several significant ways with current state of the art Enterprise Application Integration (EAI) techniques involving point-to-point exchanges of data via hard-coded application programming interfaces (APIs) and Message-Oriented Middleware (MOM) technologies. These are problematic because they require adhering to a priori negotiated protocols and message formats, usually in short-lived, ad-hoc integration efforts. Specifically, a new information model and two new architectural layers to the canonical "enterprise architecture stack" are provided, as well as a general method to operationalize the near real-time synchronization of relevant domain-specific data between stake-holding systems-of-record (SORs). Significantly, it achieves this in a manner that makes data sharing implicit and transparent, rather than explicit and obtrusive. This "behind the scenes" synchronization, powered by a distributed dataflow technology that is savvy with respect to truth over time, optionally occurs, per the disclosed methods, even across organizational boundaries, such that managed SORs running on participating IT networks are entirely passive beneficiaries of the data sharing scheme. In other words, they continue to operate normally, without explicit knowledge of the fact that domain information is being exchanged between themselves and other SORs, both internally and externally to the IT network on which they are running. Advantageously, each managed SOR participating in the disclosed interoperability system is therefore free to continue to operate as if indeed it is the definitive "source of truth" it was supposed to be all along, but that, in the real world, it cannot truly be, given the current state of the art, and in the absence (until now) of the very tools, techniques, methods and software systems of the disclosed embodiments. Finally, the disclosed system's intentional and specifically designed feature of domain-neutrality provides for relevant information to be shared even between systems in tangentially related or substantially unrelated domains, where the data elements of the disparate domains at least partially overlap, and can be semantically linked with the aid of readily available subject matter expertise in a collaborative workflow, leveraging existing investments in so-called "linked data" (aka, "semantic web") technologies.

Furthermore, the approach set forth herein may advantageously provide an architecture for the interoperability of disparate SORs which may operate based upon different database structures, so that they may all update shared data, and without having to modify their respective operational semantics. That is, the present approach may advantageously provide an infrastructure allowing for unobtrusive change detection and propagation specific to the database technology of its respective SOR, and without modifying the operational semantics or core data requirements of the SOR under management.

Moreover, the present approach may also advantageously keep these otherwise disparate SORs accurate, up-to-date, and in-sync with respect to common entity data through a shared source of truth, namely the distributed domain cache, with each instance of the cache including some useful subset of the known identities relevant to the respective SOR(s) under its purview. In addition, the present approach may allow legacy systems to continue to run alongside other systems, and even their eventual replacements, until such time as all data is aligned, to help avoid database "rip and replace" strategies that may be very disruptive to an organization. That is, the techniques described herein may allow for the gradual replacement of legacy database systems with minimal disruption to the usual and customary business processes of the adopting organization.

Many modifications and other embodiments will come to the mind of one skilled in the art having the benefit of the teachings presented in the foregoing descriptions and the That which is claimed is:

1. A system comprising:
a plurality of systems of record (SORs) each including a respective database operating autonomously at an enterprise data layer based upon different respective database protocols and formats;
a plurality of change monitors operating at an interop services layer to communicate with respective SORs using respective database protocols and formats, the change monitors configured to detect discrete Create-Retrieve-Update-Delete (CRUD) operations on their respective SORs related to at least one shared identity to generate an identity state change set corresponding to a current state of the at least one shared identity;
a transactor operating at the interop services layer and communicating with the change monitors in a common domain language to transact the identity state change set, with associated metadata, to a distributed immutable long-term storage as a current transaction;
a domain cache instance operating at a cloud data layer and cooperating with the distributed immutable long-term storage to propagate the identity state change set and associated metadata to recreate the current state of the at least one shared identity as of a time of the current transaction to at least one domain cache instance using the common domain language, the domain cache instance providing a transaction history including respective states of the at least one shared identity known to each of the SORs as of the time of each transaction in the transaction history; and
a plurality of local state change alignment services each operating at a respective SOR and communicating with the domain cache instance in the common domain language, each local state change alignment service configured to communicate with the database of its respective SOR using the respective database protocol and format thereof and make available locally to the respective SOR the states of the at least one shared identity known to the other SORs at one or more points in the transaction history from the at least one domain cache instance.

2. The system of claim 1 wherein the local state change alignment services are further configured to cooperate with the plurality of SORs to align divergent data points otherwise preventing the SORs from recreating the current state of the at least one shared identity.

3. The system of claim 1 wherein the metadata includes instructions for repeatably recreating the current state of the at least one shared identity as of the time of the current transaction.

4. The system of claim 1 wherein the identity state change set corresponds to graph-based information about the at least one shared identity.

5. The system of claim 1 wherein the change monitors are configured to cooperate with their respective SORs to detect the discrete CRUD operations based upon an SOR adapter service process operating independently of the given SOR.

6. The system of claim 5 wherein the SOR adapter service does not modify operational semantics or core data requirements associated with the given SOR.

7. The system of claim 1 wherein the transactor is further configured to generate a master identity index including the at least one shared identity to be replicated across the plurality of SORs.

8. The system of claim 1 wherein the management server is configured to cooperate with the given SOR to store an immutable log in the long-term storage verified using a blockchain algorithm.

9. A system for use with a plurality of systems of record (SORs) each including a respective database operating autonomously at an enterprise data layer based upon different respective database protocols and formats and comprising:
a plurality of change monitors operating at an interop services layer to communicate with respective SORs using respective database protocols and formats, the change monitors configured to detect discrete Create-Retrieve-Update-Delete (CRUD) operations on their respective SORs related to at least one shared identity to generate an identity state change set corresponding to a current state of the at least one shared identity;
a transactor operating at the interop services layer and communicating with the change monitors in a common domain language to transact the identity state change set, with associated metadata, to a distributed immutable long-term storage as a current transaction;
a domain cache instance operating at a cloud data layer and cooperating with the distributed immutable long-term storage to propagate the identity state change set and associated metadata to recreate the current state of the at least one shared identity as of a time of the current transaction to at least one domain cache instance using the common domain language, the domain cache instance providing a transaction history including respective states of the at least one shared identity known to each of the SORs as of the time of each transaction in the transaction history; and
a plurality of local state change alignment services each operating at a respective SOR and communicating with the domain cache instance in the common domain language, each local state change alignment service configured to communicate with the database of its respective SOR using the respective database protocol and format thereof and make available locally to the respective SOR the states of the at least one shared identity known to the other SORs at one or more points in the transaction history from the at least one domain cache instance.

10. The system of claim 9 wherein the local state change alignment services are further configured to cooperate with the plurality of SORs to align divergent data points otherwise preventing the SORs from recreating the current state of the at least one shared identity.

11. The system of claim 9 wherein the metadata includes instructions for repeatably recreating the current state of the at least one shared identity as of the time of the current transaction.

12. The system of claim 9 wherein the identity state change set corresponds to graph-based information about the at least one shared identity.

13. The system of claim 9 wherein the change monitors are further configured to cooperate with the given SOR to detect the discrete CRUD operations based upon an SOR adapter service process operating independently of the given SOR.

14. A method comprising:

operating a plurality of systems of record (SORs) each including a respective database operating autonomously at an enterprise data layer based upon different respective database protocols and formats;

operating a plurality of change monitors operating at an interop services layer to communicate with respective SORs using respective database protocols and formats to detect discrete Create-Retrieve-Update-Delete (CRUD) operations on their respective SORs related to at least one shared identity to generate an identity state change set corresponding to a current state of the at least one shared identity;

operating a transactor at the interop services layer for communicating with the change monitors in a common domain language to transact the identity state change set, with associated metadata, to a distributed immutable long-term storage as a current transaction;

operating a domain cache instance at a cloud data layer for cooperating with the distributed immutable long-term storage to propagate the identity state change set and associated metadata to recreate the current state of the at least one shared identity as of a time of the current transaction to at least one domain cache instance using the common domain language, the domain cache instance providing a transaction history including respective states of the at least one shared identity known to each of the SORs as of the time of each transaction in the transaction history; and operating a plurality of local state change alignment services at a respective SOR for communicating with the domain cache instance in the common domain language and communicating with the database of its respective SOR using the respective database protocol and format thereof to make available locally to the respective SOR the states of the at least one shared identity known to the other SORs at one or more points in the transaction history from the at least one domain cache instance.

15. The method of claim 14 further comprising operating the local state change alignment services in cooperation with the plurality of SORs to align divergent data points otherwise preventing the SORs from recreating the current state of the at least one shared identity.

16. The method of claim 14 wherein the metadata includes instructions for repeatably recreating the current state of the at least one shared identity as of the time of the current transaction.

17. The method of claim 14 wherein the identity state change set corresponds to graph-based information about the at least one shared identity.

18. The method of claim 14 further comprising operating the change monitors in cooperation with the given SOR to detect the discrete CRUD operations based upon an SOR adapter service process operating independently of the given SOR.

* * * * *